(12) United States Patent
Yamagishi et al.

(10) Patent No.: US 7,965,203 B2
(45) Date of Patent: Jun. 21, 2011

(54) VIDEO QUALITY ESTIMATION APPARATUS, METHOD, AND PROGRAM

(75) Inventors: Kazuhisa Yamagishi, Tokyo (JP); Takanori Hayashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 893 days.

(21) Appl. No.: 11/886,408

(22) PCT Filed: Nov. 28, 2006

(86) PCT No.: PCT/JP2006/323731
§ 371 (c)(1),
(2), (4) Date: Sep. 13, 2007

(87) PCT Pub. No.: WO2007/129422
PCT Pub. Date: Nov. 15, 2007

(65) Prior Publication Data
US 2009/0262198 A1 Oct. 22, 2009

(30) Foreign Application Priority Data

May 9, 2006 (JP) ................................. 2006-130080
May 9, 2006 (JP) ................................. 2006-130090

(51) Int. Cl.
*G08G 1/123* (2006.01)
(52) U.S. Cl. ..................................... 340/995.1; 340/988
(58) Field of Classification Search ................ 340/995.1
See application file for complete search history.

(56) References Cited

FOREIGN PATENT DOCUMENTS

| JP | 2004-343415 | | 12/2004 |
|---|---|---|---|
| JP | 2005-142900 | A | 6/2005 |
| JP | 2006-033722 | A | 2/2006 |
| JP | 2006-074333 | A | 3/2006 |

OTHER PUBLICATIONS

Yamagishi et al., "Video quality Estimation Model based on Displaysize and Resolution for Audiovisual Communication Services", IEICE Technical Report, Sep. 2005, vol. 105, No. 282, pp. 61-64, CQ2005-60.*
Miyata et al., "Scalable Video Coding based on Subjective Quality—An Approach of Nonuniform Frame Period -", SIG Technical Report, Oct. 2003, vol. 2003, No. 99, pp. 29-34, 2003-AVM-42.*
Inazumi Yasuhiro, Yoshida Toshiyuki, Sakai Yoshinori, Horita Yuukou, Estimation of the Optical Framerate for Video Communications under Bitrate Constraints, vol. J85-B, No. 7, pp. 1130-1142, Jul. 2002.
Arayama et. al., "Opinion model for audio-visual communication quality from quality parameters by coding and packet loss", IEICE Technical Report, Nov. 2005, vol. 105, No. 406, pp. 57-60, CQ2005-77.

(Continued)

*Primary Examiner* — Travis R Hunnings
(74) *Attorney, Agent, or Firm* — Blakely, Sokoloff, Taylor & Zafman LLP

(57) ABSTRACT

In estimating subjective video quality corresponding to main parameters (121/221) which are input as an input coding bit rate (121B/221B) representing the number of coding bit rates per unit time and an input frame rate (121A/221A) representing the number of frames per unit time of an audiovisual medium, an estimation model specifying unit specifies, on the basis of the input coding bit rate (121B/input frame rate (221A)), an estimation model (122/222) representing the relationship between subjective video quality and the frame rate (/coding bit rate) of the audiovisual medium. Subjective video quality corresponding to the input frame rate (121A/input coding bit rate 221B) is estimated by using the specified estimation model (122/222) and output as an estimation value (123/223).

37 Claims, 23 Drawing Sheets

OTHER PUBLICATIONS

Yamagishi et al., "Video Quality Opinion Model for Audiovisual Communication Services", IEICE, Oct. 2006.

Yamagishi et al., "Verification of Video Quality Opinion Model for Audiovisual Communication Services", Proceedings of IEICE Society Conference, Sep. 2006, B-11-20.

Yamagishi et al., "A Proposal of Video Quality Opinion Model for Audiovisual Communication Services", IEICE Technical Report, Jul. 2006, vol. 106, No. 153, CQ2006-28.

Yamagishi et al., "Video quality estimation function for videophone services", ITU-T SG12, Jun. 2006.

Yamagishi et al., "Opinion Model for Estimating Video Quality of Videophone Services", IEEE Global Telecommunications Conference, Nov.-Dec. 2006, QRP08-1.

Yamagishi et al., "Verification of Video Quality Opinion Model for Videophone Services", $2^{nd}$ ISCA/DEGA Tutorial and Research Workshop on Perceptual Quality of Systems, Sep. 2006.

\* cited by examiner

FIG. 13

COEFFICIENT DATABASE 125

| COMMUNICATION TYPE PARAMETER 124A | REPRODUCTION PERFORMANCE PARAMETER 124B | | | | | REPRODUCTION ENVIRONMENT PARAMETER 124C | CHARACTERISTIC COEFFICIENTS 126 | | | | |
|---|---|---|---|---|---|---|---|---|---|---|---|
| TASK | ENCODING METHOD | VIDEO FORMAT | KEY FRAME [sec] | MONITOR SIZE [inch] | MONITOR RESOLUTION | INDOOR LUMINANCE | a | b | c | … | g |
| VIDEOPHONE | MPEG1 | VGA | 1 | 17 | 1280 × 1024 | 500 | 0.2 | 0.3 | 0.5 | … | 0.5 |
| VIDEO DISTRIBUTION | MPEG4 | QVGA | 3 | 15 | 1024 × 768 | 500 | 0.7 | 0.5 | 0.6 | … | 0.9 |
| VIDEO DISTRIBUTION | H264 | QVGA | 3 | 15 | 1024 × 768 | 500 | 0.2 | 0.9 | 0.7 | … | 0.8 |
| ⋮ | ⋮ | ⋮ | ⋮ | ⋮ | ⋮ | ⋮ | | | ⋯ | | |

| INPUT FRAME RATE fr [fps] | BEST VIDEO QUALITY β(fr) [MOS] | VIDEO QUALITY FIRST CHANGE INDEX s(fr) | VIDEO QUALITY SECOND CHANGE INDEX t(fr) |
|---|---|---|---|
| 30 | 4.8 | 500 | 1.73 |
| ⋮ | ⋮ | ⋮ | ⋮ |
| 15 | 4.3 | 260 | 1.97 |
| ⋮ | ⋮ | ⋮ | ⋮ |
| 10 | 3.8 | 240 | 2.06 |

FIG. 31

COEFFICIENT DATABASE 225

| | COMMUNICATION TYPE PARAMETER 224A | REPRODUCTION PERFORMANCE PARAMETER 224B | | | | | REPRODUCTION ENVIRONMENT PARAMETER 224C | CHARACTERISTIC COEFFICIENTS 226 | | | | |
|---|---|---|---|---|---|---|---|---|---|---|---|---|
| | TASK | ENCODING METHOD | VIDEO FORMAT | KEY FRAME [sec] | MONITOR SIZE [inch] | MONITOR RESOLUTION | INDOOR LUMINANCE | h | i | j | … | o |
| | VIDEOPHONE | MPEG1 | VGA | 1 | 17 | 1280 × 1024 | 500 | 0.2 | 0.3 | 0.5 | … | 0.5 |
| | VIDEO DISTRIBUTION | MPEG4 | QVGA | 3 | 15 | 1024 × 768 | 500 | 0.7 | 0.5 | 0.6 | … | 0.9 |
| | VIDEO DISTRIBUTION | H264 | QVGA | 3 | 15 | 1024 × 768 | 500 | 0.2 | 0.9 | 0.7 | … | 0.8 |
| | … | | | | | | | | | | | |

VIDEO QUALITY ESTIMATION APPARATUS, METHOD, AND PROGRAM

The present patent application is a non-provisional application of International Application No. PCT/JP2006/323731, filed Nov. 28, 2006.

TECHNICAL FIELD

The present invention relates to an audiovisual communication technique and, more particularly, to a video quality estimation technique of estimating subjective video quality a viewer actually senses when a terminal receives and reproduces an audiovisual medium encoded into a plurality of frames.

BACKGROUND ART

Advance in high-speed and broadband Internet access networks is raising expectations for spread of audiovisual communication services which transfer audiovisual media containing video and audio data between terminals or server terminals via the Internet.

Audiovisual communication services of this type use encoding communication to improve the audiovisual medium transfer efficiency, in which an audiovisual medium is encoded into a plurality of frames and transferred using intra-image or inter-frame autocorrelation of the audiovisual medium or human visual characteristic.

On the other hand, a best-effort network such as the Internet used for the audiovisual communication services does not always guarantee the communication quality. For this reason, in transferring a streaming content such as an audiovisual medium having a temporal continuity via the Internet, narrow bands or congestions in communication lines are perceptible as degradation in quality, i.e., subjective video quality a viewer actually senses from the audiovisual medium received and reproduced via the communication lines. Additionally, encoding by an application adds encoding distortions to the video image, which are perceptible as degradation in subjective video quality. More specifically, the viewer perceives degradation in quality of an audiovisual medium as defocus, blur, mosaic-shaped distortion, and jerky effect in the video image.

In the audiovisual communication services that transfer audiovisual media, quality degradation is readily perceived. To provide a high-quality audiovisual communication service, quality design of applications and networks before providing the service and quality management after the start of the service are important. This requires a simple and efficient video quality evaluation technique capable of appropriately expressing video quality enjoyed by a viewer.

As a conventional technique of estimating the quality of an audio medium as one of streaming contents, ITU-T recommendation P.862 (International Telecommunication Union-Telecommunication Standardization Sector) defines an objective speech quality evaluation method PESQ (Perceptual Evaluation of Speech Quality) which inputs a speech signal. ITU-T recommendation G.107 describes an audio quality estimation method which inputs audio quality parameters and is used for quality design in VoIP (Voice over IP).

On the other hand, as a technique of estimating the quality of a video medium, an objective video image evaluation method (e.g., ITU-T recommendation J.144: to be referred to as reference 1 hereinafter) which inputs a video signal is proposed as a recommendation. A video quality estimation method which inputs video quality parameters is also proposed (e.g., Yamagishi & Hayashi, "Video Quality Estimation Model based on Displaysize and Resolution for Audiovisual Communication Services", IEICE Technical Report CQ2005-90, 2005/09, pp. 61-64: to be referred to as reference 2 hereinafter). This technique formalizes the video quality on the basis of the relationship between the video quality and each video quality parameter and formalizes the video quality by the linear sum of the products. A quality estimation model taking coding parameters and packet loss into account is also proposed (e.g., Arayama, Kitawaki, & Yamada, "Opinion model for audio-visual communication quality for quality parameters by coding and packet loss", IEICE Technical Report CQ2005-77, 2005/11, pp. 57-60: to be referred to as reference 3 hereinafter).

DISCLOSURE OF INVENTION

Problems to be Solved by the Invention

In quality design and quality management of applications and networks, specific and useful guidelines for quality design/management corresponding to various conditions related to audiovisual communication services are necessary. Especially because of the existence of many factors, i.e., video quality parameters affecting the video quality of an audiovisual communication service, it is important to obtain guidelines for quality design/management to know the influence of video quality parameters on the video quality or a specific video quality parameter that should be improved and its improving effect on the video quality.

Factors greatly affecting the video quality are a coding bit rate and a frame rate which represent the contents of encoding of an audiovisual medium. The coding bit rate is a value representing the number of coding bits per unit time of an audiovisual medium. The frame rate is a value representing the number of frames per unit time of an audiovisual medium.

In providing a video image encoded at a certain coding bit rate, when the video image is encoded at a high frame rate, the temporal video quality can be improved because a smooth video image is obtained. On the other hand, spatial image degradation may become noticeable because of the decrease in the number of coding bits per unit frame, resulting in poor video quality. When the video image is encoded by using a large number of coding bits per unit frame, spatial image degradation improves so that a higher video quality can be obtained. However, since the number of frames per unit time decreases, temporal frame drop with a jerky effect may take place, resulting in poor video quality.

Hence, specific and useful guidelines for quality design/management are important in network quality design before providing the service and quality management after the start of the service to know the set values of the coding bit rate and frame rate and video quality corresponding to them in consideration of the tradeoff between the number of coding bits per unit frame and the frame rate with respect to video quality.

However, the objective quality evaluation method using a video signal as an input which is described in reference 1 above, estimates the video quality in consideration of a feature of a video image, i.e., a feature calculated from spatial and temporal distortions. Hence, the influence of many factors, i.e., video quality parameters on the video quality of an audiovisual communication service is indefinite. It is therefore impossible to obtain guidelines for quality design/management to know a video quality parameter that should be improved and its improving effect on the video quality.

References 2 and 3 above describe video quality estimation methods using video quality parameters as an input. In these methods, however, the tradeoff between the number of coding bits per unit frame and the frame rate with respect to video quality is not taken into consideration. It is therefore impossible to obtain specific and useful guidelines for quality design/management in quality design and quality management of applications and networks.

In reference 2, video quality is formalized on the basis of the relationship between the video quality and each video quality parameter. However, it is impossible to appropriately calculate an optimum frame rate corresponding to each coding bit rate so appropriate video quality estimation cannot be done.

Reference 3 describes a video quality estimation method which formalizes video quality on the basis of the relationship between a coding bit rate and packet loss. However, the frame rate as a factor of temporal degradation is not taken into consideration. As a characteristic, video quality converges to an arbitrary maximum value as the coding bit rate becomes high. In reference 3, however, since video quality is estimated using a quadratic function, the estimation model exhibits video quality degradation at a certain coding bit rate or more, resulting in an effect opposite to the above characteristic.

The present invention has been made to solve the above-described problems, and has as its object to provide a video quality estimation apparatus, method, and program capable of obtaining specific and useful guidelines for quality design/management considering the tradeoff between the number of coding bits per unit frame and the frame rate with respect to video quality.

Means of Solution to the Problems

To solve the above-described problems, a video quality estimation apparatus according to the present invention comprises a parameter extraction unit which extracts, as main parameters including an input coding bit rate and an input frame rate, respectively, audiovisual medium parameters including a coding bit rate representing the number of coding bits per unit time and a frame rate representing the number of frames per unit time of an audiovisual medium encoded into a plurality of frames, an estimation model specifying unit which specifies, on the basis of the main parameter corresponding to one parameter of the audiovisual medium parameters, an estimation model representing a relationship between subjective video quality and the other parameter of the audiovisual medium parameters, and a video quality estimation unit which estimates subjective video quality corresponding to the main parameter corresponding to one parameter by using the specified estimation model and outputs the subjective video quality as an estimation value of subjective video quality a viewer actually senses from the audiovisual medium received via a communication network and reproduced on an arbitrary terminal.

A video quality estimation method according to the present invention comprises the parameter extraction step of causing a parameter extraction unit to extract, as main parameters including an input coding bit rate and an input frame rate, respectively, audiovisual medium parameters including a coding bit rate representing the number of coding bits per unit time and a frame rate representing the number of frames per unit time of an audiovisual medium encoded into a plurality of frames, the estimation model specifying step of causing an estimation model specifying unit to specify, on the basis of the main parameter corresponding to one parameter of the audiovisual medium parameters, an estimation model representing a relationship between subjective video quality and the other parameter of the audiovisual medium parameters, and the video quality estimation step of causing a video quality estimation unit to estimate subjective video quality corresponding to the main parameter corresponding to one parameter by using the specified estimation model and output the subjective video quality as an estimation value of subjective video quality a viewer actually senses from the audiovisual medium received via a communication network and reproduced on an arbitrary terminal.

A program according to the present invention causes a computer of a video quality estimation apparatus which calculates, for audiovisual communication to transmit an audiovisual medium encoded into a plurality of frames to an arbitrary terminal via a communication network, an estimation value of subjective video quality a viewer actually senses from the audiovisual medium reproduced on the terminal by using a predetermined estimation model, to execute the parameter extraction step of causing a parameter extraction unit to extract, as main parameters including an input coding bit rate and an input frame rate, respectively, audiovisual medium parameters including a coding bit rate representing the number of coding bits per unit time and a frame rate representing the number of frames per unit time of the audiovisual medium, the estimation model specifying step of causing an estimation model specifying unit to specify, on the basis of the main parameter corresponding to one parameter of the audiovisual medium parameters, an estimation model representing a relationship between subjective video quality and the other parameter of the audiovisual medium parameters, and the video quality estimation step of causing a video quality estimation unit to estimate subjective video quality corresponding to the main parameter corresponding to one parameter by using the specified estimation model and output the subjective video quality as an estimation value of subjective video quality a viewer actually senses from the audiovisual medium received via a communication network and reproduced on an arbitrary terminal.

Effects of the Invention

According to the present invention, in estimating subjective video quality corresponding to main parameters which are input as an input coding bit rate representing the number of coding bit rates per unit time and an input frame rate representing the number of frames per unit time of an audiovisual medium, an estimation model specifying unit specifies, on the basis of the input coding bit rate (input frame rate), an estimation model representing the relationship between subjective video quality and the frame rate (coding bit rate) of the audiovisual medium. Subjective video quality corresponding to the input frame rate (input coding bit rate) is estimated by using the specified estimation model.

It is therefore possible to obtain a video quality estimation value corresponding to the input frame rate (input coding bit rate) input as an estimation condition by referring to the estimation model corresponding to the input coding bit rate (input frame rate) input as an estimation condition.

This allows to obtain specific and useful guidelines for quality design/management to know the set values of the coding bit rate and frame rate and video quality corresponding to them in consideration of the tradeoff between the number of coding bits per unit frame and the frame rate with respect to video quality. The guidelines are highly applicable in quality design of applications and networks before providing a service and quality management after the start of the service.

BRIEF DESCRIPTION OF DRAWINGS

FIG. 13 is an explanatory view showing an arrangement of a coefficient DB;

FIG. 31 is an explanatory view showing an arrangement of a coefficient DB;

BEST MODE FOR CARRYING OUT THE INVENTION

The embodiments of the present invention will be described next with reference to the accompanying drawings.

First Embodiment

Figure 1:
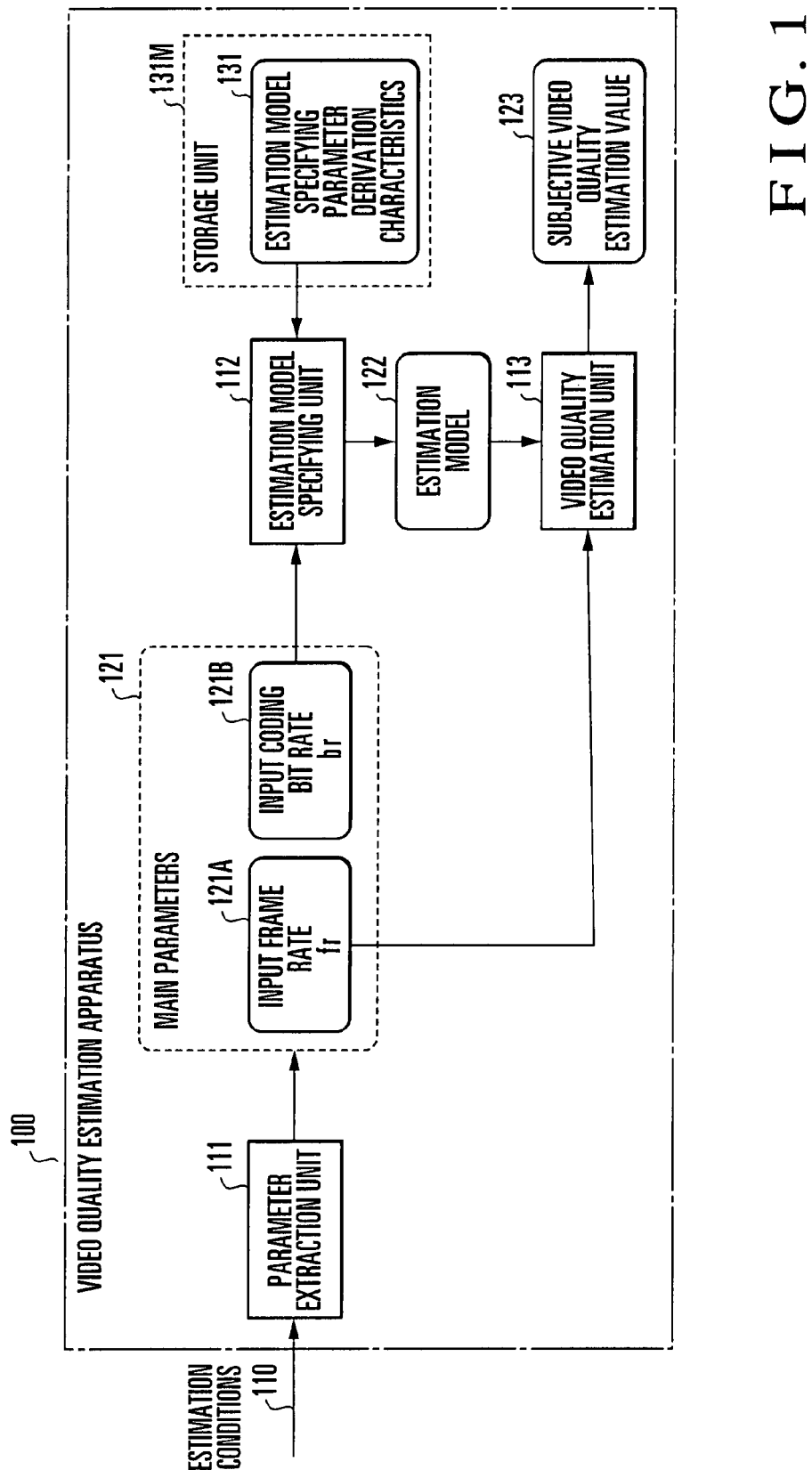
FIG. 1 is a block diagram showing the arrangement of a video quality estimation apparatus according to the first embodiment of the present invention.

A video quality estimation apparatus according to the first embodiment of the present invention will be described first with reference to FIG. 1. FIG. 1 is a block diagram showing the arrangement of the video quality estimation apparatus according to the first embodiment of the present invention.

A video quality estimation apparatus 100 is formed from an information processing apparatus such as a computer that calculates input information. In audiovisual communication for transmitting an audiovisual medium encoded into a plurality of frames to an arbitrary terminal via a communication network, the video quality estimation apparatus 100 inputs estimation conditions about the audiovisual medium and calculates, by using a predetermined estimation model, the estimation value of subjective video quality a viewer actually senses from the audiovisual medium reproduced on the terminal.

In this embodiment, in estimating subjective video quality corresponding to main parameters which are input as an input coding bit rate representing the number of coding bits per unit time and an input frame rate representing the number of frames per unit time of an audiovisual medium, an estimation model representing the relationship between the frame rate and the subjective video quality of the audiovisual medium is specified on the basis of the input coding bit rate. Subjective video quality corresponding to the input frame rate is estimated by using the specified estimation model and output as an estimation value.

[Video Quality Estimation Apparatus]

Figure 2:
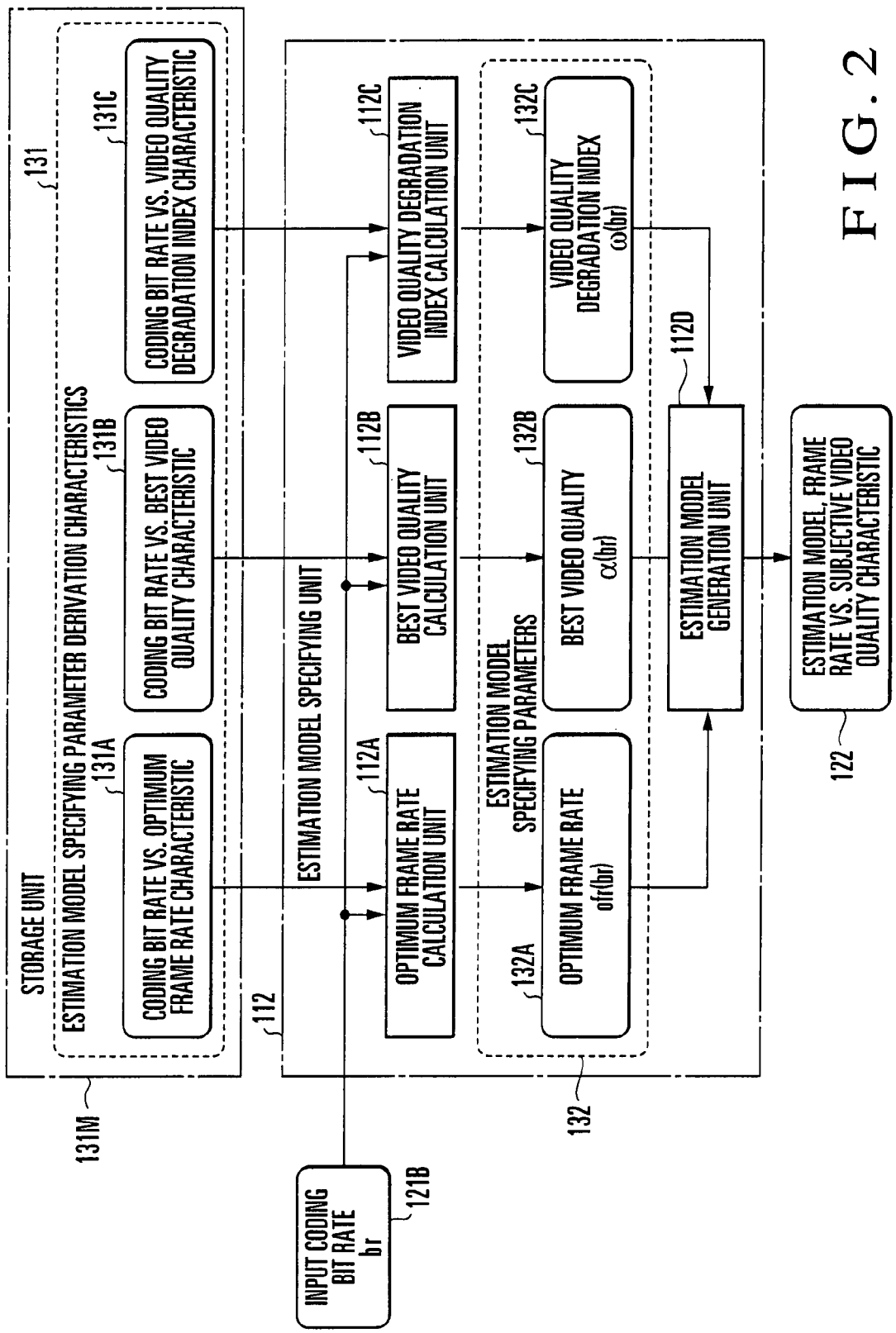
FIG. 2 is a block diagram showing the arrangement of the estimation model specifying unit of the video quality estimation apparatus according to the first embodiment of the present invention.

The arrangement of the video quality estimation apparatus according to the first embodiment of the present invention will be described next in detail with reference to FIGS. 1 and 2. FIG. 2 is a block diagram showing the arrangement of the estimation model specifying unit of the video quality estimation apparatus according to the first embodiment of the present invention.

The video quality estimation apparatus 100 includes a parameter extraction unit 111, estimation model specifying unit 112, and video quality estimation unit 113 as main functional units. These functional units may be implemented either by dedicated calculation circuits or by providing a microprocessor such as a CPU and its peripheral circuits and making the microprocessor read out and execute a program prepared in advance to cause the hardware and program to cooperate with each other. Storage units (to be described later) including storage devices such as a memory and a hard disk store pieces of process information used in these functional units. The pieces of process information are exchanged between the functional units via a storage unit (not shown) including a storage device. The program may be stored in the storage unit. The video quality estimation apparatus 100 also includes various fundamental components such as a storage device, operation input device, and screen display device, like a general information processing apparatus.

The parameter extraction unit 111 has a function of extracting various kinds of estimation conditions 110 related to an evaluation target audiovisual communication service, a function of extracting a frame rate and a coding bit rate related to encoding of an audiovisual medium from the estimation conditions 110, and a function of outputting the extracted coding bit rate and frame rate as main parameters 121 including an input frame rate fr (121A) and an input coding bit rate br (121B). The operator can input the estimation conditions 110 by using an operation input device such as a keyboard.

Alternatively, the estimation conditions 110 may be either acquired from an external device, recording medium, or communication network by using a data input/output device for inputting/outputting data or measured from an actual audiovisual communication service.

The estimation model specifying unit 112 has a function of calculating, on the basis of the input coding bit rate 121B of the main parameters 121 output from the parameter extraction unit 111, estimation model specifying parameters 132 to specify an estimation model 122 representing the relationship between the frame rate and the subjective video quality of an audiovisual medium.

The video quality estimation unit 113 has a function of estimating, by referring to the estimation model 122 specified by the estimation model specifying unit 112, subjective video quality corresponding to the input frame rate 121A of the main parameters 121 and outputting the subjective video quality as a desired subjective video quality estimation value 123.

The estimation model specifying unit 112 also includes several functional units, as shown in FIG. 2. The main functional units for calculating the estimation model specifying parameters 132 include an optimum frame rate calculation unit 112A, best video quality calculation unit 112B, video quality degradation index calculation unit 112C, and estimation model generation unit 112D.

The estimation model specifying parameters 132 are values which specify the shapes of functions to be used as the estimation model 122. In this embodiment, at least the optimum frame rate and best video quality to be described below are used as the estimation model specifying parameters 132. Another parameter represented by a video quality degradation index may be added to the estimation model specifying parameters 132.

The optimum frame rate calculation unit 112A has a function of calculating, as one of the estimation model specifying parameters 132, an optimum frame rate ofr(br) (132A) representing a frame rate corresponding to the best subjective video quality of an audiovisual medium transmitted at the input coding bit rate br (121B) by referring to a coding bit rate vs. optimum frame rate characteristic 131A in a storage unit (first storage unit) 131M.

The best video quality calculation unit 112B has a function of calculating, as one of the estimation model specifying parameters 132, best video quality α(br) (132B) representing the best value of the subjective video quality of an audiovisual medium transmitted at the input coding bit rate 121B by referring to a coding bit rate vs. best video quality characteristic 131B in the storage unit 131M.

The video quality degradation index calculation unit 112C has a function of calculating, as one of the estimation model specifying parameters 132, a video quality degradation index ω(br) (132C) representing the degree of degradation from the best video quality 132B representing the best value of the subjective video quality of an audiovisual medium transmitted at the input coding bit rate 121B by referring to a coding bit rate vs. video quality degradation index characteristic 131C in the storage unit 131M.

The coding bit rate vs. optimum frame rate characteristic 131A, coding bit rate vs. best video quality characteristic 131B, and coding bit rate vs. video quality degradation index characteristic 131C are prepared as estimation model specifying parameter derivation characteristics 131 and stored in the storage unit 131M (first storage unit) in advance.

The estimation model generation unit 112D has a function of generating the estimation model 122 to estimate subjective video quality corresponding to the input frame rate 121A of the main parameters 121 by substituting, into a predetermined function expression, the values of the estimation model specifying parameters 132 including the optimum frame rate ofr (br) calculated by the optimum frame rate calculation unit 112A, the best video quality α(br) calculated by the best video quality calculation unit 112B, and the video quality degradation index ω(br) calculated by the video quality degradation index calculation unit 112C.

[Subjective Video Quality Characteristic]

Figure 3:
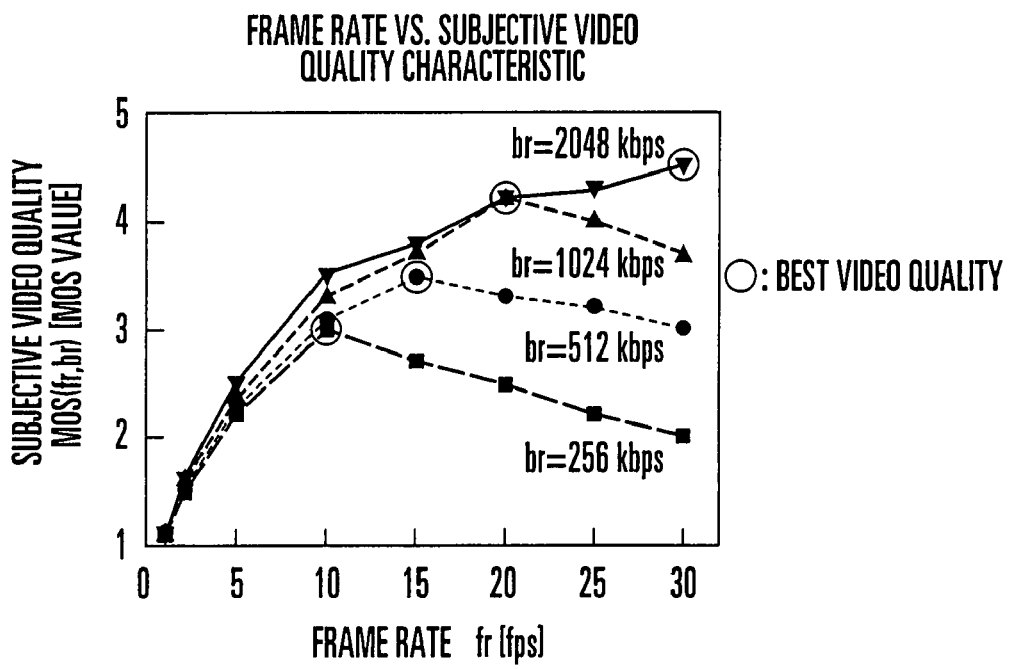
FIG. 3 is a graph showing a frame rate vs. subjective video quality characteristic of an audiovisual medium in an audiovisual communication service.

The subjective video quality characteristic of an audiovisual medium in an audiovisual communication service will be described next with reference to FIG. 3. FIG. 3 is a graph showing the frame rate vs. subjective video quality characteristic of an audiovisual medium in an audiovisual communication service. Referring to FIG. 3, the abscissa represents a frame rate fr (fps), and the ordinate represents a subjective video quality value MOS(fr, br) (MOS value). FIG. 3 shows characteristics corresponding to the respective coding bit rates br.

The number of coding bits per unit frame and the frame rate have a tradeoff relationship with respect to the subjective video quality of an audiovisual medium.

More specifically, in providing a video image encoded at a certain coding bit rate, when the video image is encoded at a high frame rate, the temporal video quality can be improved because a smooth video image is obtained. On the other hand, spatial image degradation may become noticeable because of the decrease in the number of coding bits per unit frame, resulting in poor video quality. When the video image is encoded by using a large number of coding bits per unit frame, spatial image degradation improves so that a higher video quality can be obtained. However, since the number of frames per unit time decreases, temporal frame drop with a jerky effect may take place, resulting in poor video quality.

As is apparent From FIG. 3, an optimum frame rate, i.e., an optimum frame rate at which maximum video quality, i.e., best video quality is obtained exists in correspondence with each coding bit rate. Even when the frame rate increases beyond the optimum frame rate, video quality does not improve. For example, when coding bit rate br=256 [kbbs], the subjective video quality characteristic exhibits a convex shape with a vertex of best video quality=3 [MOS] corresponding to frame rate fr=10 [fps].

The subjective video quality characteristic exhibits a similar shape even when the coding bit rate changes. The coordinate position of each subjective video quality characteristic can be specified by its vertex, i.e., estimation model specifying parameters including the optimum frame rate and best video quality.

This embodiment places focus on such property of the subjective video quality characteristic. The estimation model specifying unit 112 specifies the estimation model 122 representing the relationship between the frame rate and the subjective video quality of an audiovisual medium on the basis of the input coding bit rate 121B. The video quality estimation unit 113 estimates the subjective video quality estimation value 123 corresponding to the input frame rate 121A by using the estimation model 122 specified by the estimation model specifying unit 112.

[Derivation of Estimation Model Specifying Parameters]

Derivation of the estimation model specifying parameters in the estimation model specifying unit 112 will be described next in detail.

To cause the estimation model specifying unit 112 to specify the estimation model 122 representing the relationship between the frame rate and the subjective video quality of an audiovisual medium on the basis of the input coding bit rate 121B, it is necessary to derive the optimum frame rate 132A and best video quality 132B as estimation model specifying parameters corresponding to the input coding bit rate 121B.

In this embodiment, the coding bit rate vs. optimum frame rate characteristic 131A and coding bit rate vs. best video quality characteristic 131B to be described below are prepared in advance as the estimation model specifying parameter derivation characteristics 131. The estimation model specifying parameters 132 corresponding to the input coding bit rate 121B are derived by referring to these characteristics.

Of the characteristics shown in FIG. 3, the coding bit rate when the audiovisual medium is reproduced with the best video quality and the frame rate at that time, i.e., optimum frame rate have such a relationship that the optimum frame rate monotonically increases along with the increase in coding bit rate and then converges to the maximum frame rate.

Figure 4:
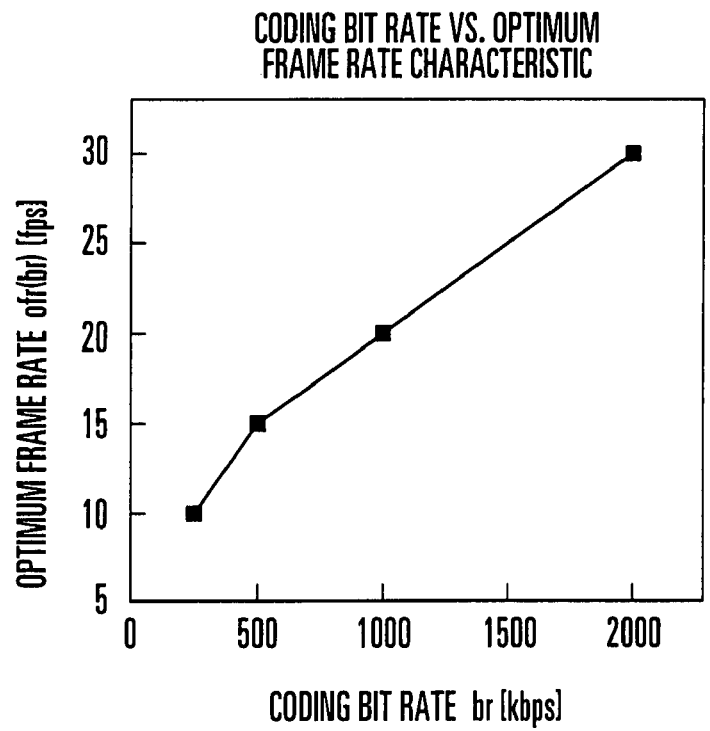
FIG. 4 is a graph showing a coding bit rate vs. optimum frame rate characteristic.

FIG. 4 is a graph showing the coding bit rate vs. optimum frame rate characteristic. Referring to FIG. 4, the abscissa represents a coding bit rate br (kbps), and the ordinate represents an optimum frame rate ofr(br) (fps).

Of the characteristics shown in FIG. 3, the coding bit rate when the audiovisual medium is transmitted at the optimum frame rate and the video quality, i.e., best video quality have a relationship with such a tendency that the video quality becomes high along with the increase in coding bit rate and then converges to a maximum value (maximum subjective video quality value) or becomes low along with the decrease in coding bit rate and then converges to a minimum value.

Figure 5:
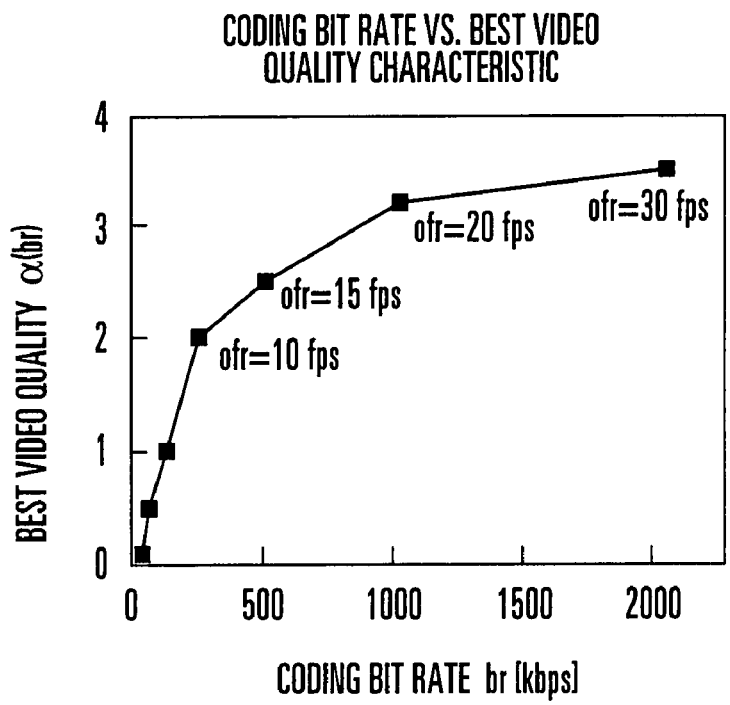
FIG. 5 is a graph showing a coding bit rate vs. best video quality characteristic.

FIG. 5 is a graph showing the coding bit rate vs. best video quality characteristic. Referring to FIG. 5, the abscissa represents the coding bit rate br (kbps), and the ordinate represents the best video quality α(br). Video quality is expressed by the MOS value which uses "1" as a reference value and can take "5" at maximum. The best video quality α(br) of the estimation model 122 uses "0" as a reference value and can take "4" at maximum. Although the reference values are different, these values use almost the same scale and therefore will not particularly be distinguished below.

According to this coding bit rate vs. best video quality characteristic, even when a high coding bit rate is set, the video quality is saturated at a certain coding bit rate. This matches the human visual characteristic and, more particularly, even when the coding bit rate is increased more than necessary, no viewer can visually detect the improvement of video quality. If the coding bit rate is too low, video quality conspicuously degrades and consequently converges to the minimum video quality. This matches an actual phenomenon and, more specifically, in a video image containing, e.g., a human face moving in the screen, the outlines of eyes and nose become blurred and flat so the viewer cannot recognize the face itself.

[Estimation Model]

The estimation model used by the estimation model specifying unit 112 and the method of specifying the estimation model will be described next in detail.

Figure 6:
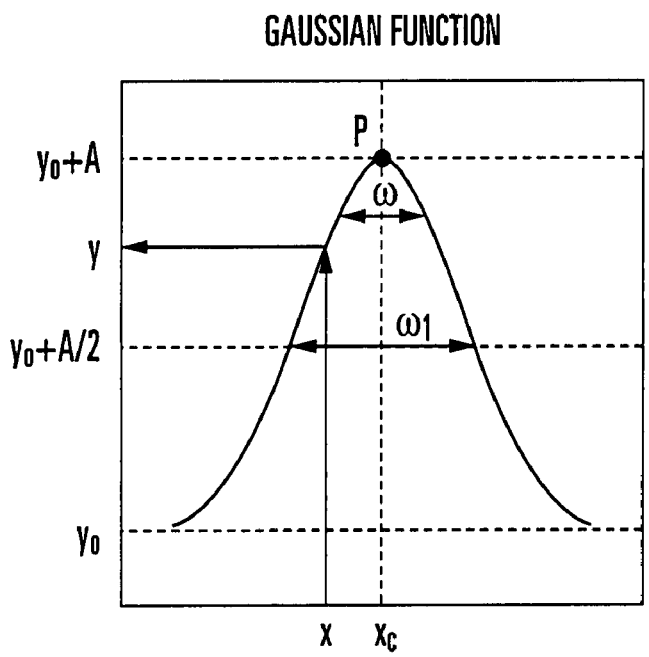
FIG. 6 is an explanatory view showing a Gaussian function.

The characteristic of a convex function having a vertex corresponding to the optimum frame rate 132A and best video quality 132B as the estimation model specifying parameters 132 can be expressed by using a Gaussian function as shown in FIG. 6. FIG. 6 is an explanatory view showing a Gaussian function.

The Gaussian function exhibits a convex shape which has a vertex P corresponding to the maximum value and attenuates from there to the both sides. The function expression is given by the x-coordinate of the vertex P and the maximum amplitude. Let $x_c$ be the x-coordinate of the vertex P, A be the maximum amplitude, $y_0$ be the reference value (minimum value) of the Y-axis, and ω be the coefficient representing the spread width of the convex characteristic. A function value y with respect to an arbitrary variable x is given by $$y = y_0 + A \cdot \exp\left\{-\frac{(x-x_c)^2}{2\omega^2}\right\} \quad (1)$$

$$\omega_1 = 2\sqrt{\ln(4)} \cdot \omega$$

Let the variable x be the logarithmic value of the frame rate of the audiovisual medium, the function value y be the subjective video quality, the variable x of the vertex P be the logarithmic value of the optimum frame rate corresponding to the coding bit rate, and the maximum amplitude A be the best video quality α(br) corresponding to the coding bit rate. In this case, a subjective video quality corresponding to an arbitrary frame rate is given by $$MOS(fr, br) = 1 + G(fr, br) \quad (2)$$

$$G(fr, br) = \alpha(br) \cdot \exp\left\{-\frac{(\ln(fr) - \ln(ofr(br)))^2}{2\omega(br)^2}\right\}$$

Figure 7:
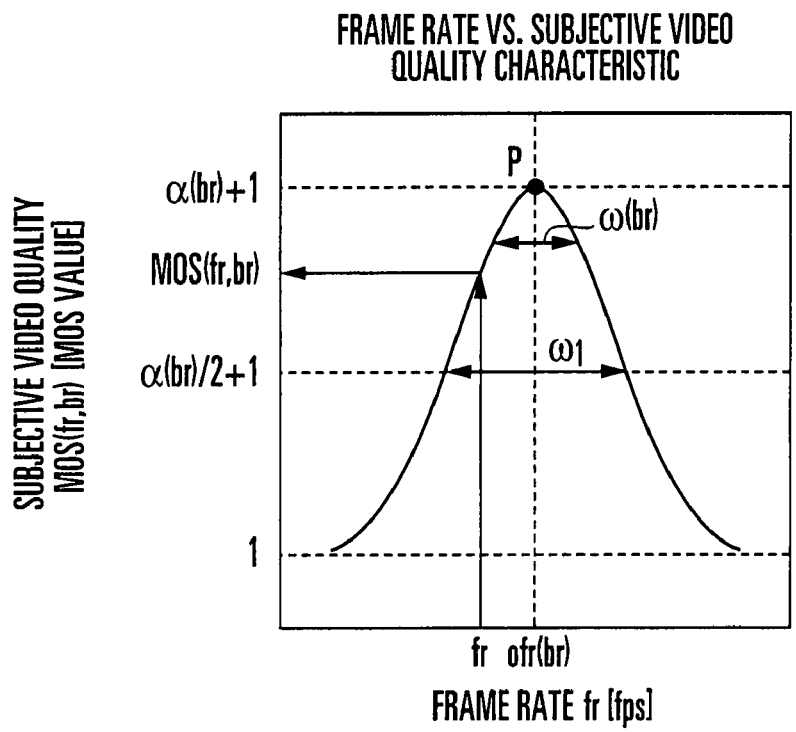
FIG. 7 is an explanatory view showing a frame rate vs. subjective video quality characteristic modeled by a Gaussian function.

It is consequently possible to specify an estimation model corresponding to the input coding bit rate, i.e., frame rate vs. subjective video quality characteristic. FIG. 7 is an explanatory view showing a frame rate vs. subjective video quality characteristic modeled by the Gaussian function.

At this time, α(br) and G(fr,br) used in equation (2) use "0" as a reference value and can take "4" at maximum. When "1" is added to G(fr,br), an actual video quality value expressed by a MOS value (1 to 5) can be obtained.

In the Gaussian function, the spread width of the convex characteristic is specified by using the coefficient ω. If it is necessary to change the spread width in correspondence with each frame rate vs. subjective video quality characteristic corresponding to a coding bit rate, the video quality degradation index ω(br) (132C) corresponding to the coding bit rate is used.

The video quality degradation index ω(br) indicates the degree of degradation from the best video quality 132B representing the best value of the subjective video quality of an audiovisual medium transmitted at the input coding bit rate 121B. The video quality degradation index ω(br) corresponds to the coefficient ω of the Gaussian function.

Of the characteristics shown in FIG. 3, the coding bit rate and the degree of degradation of subjective video quality have such a relationship that the degree of degradation becomes smooth as the coding bit rate increases, while the degree of degradation becomes large as the coding bit rate decreases. Hence, the coding bit rate and the video quality degradation index have a relationship with such a tendency that as the coding bit rate becomes high, the spread width of the convex shape of the frame rate vs. subjective video quality characteristic becomes large, and the video quality degradation index also becomes large. As the coding bit rate becomes low, the spread width of the convex shape of the frame rate vs. subjective video quality characteristic becomes small, and the video quality degradation index also becomes small.

Figure 8:
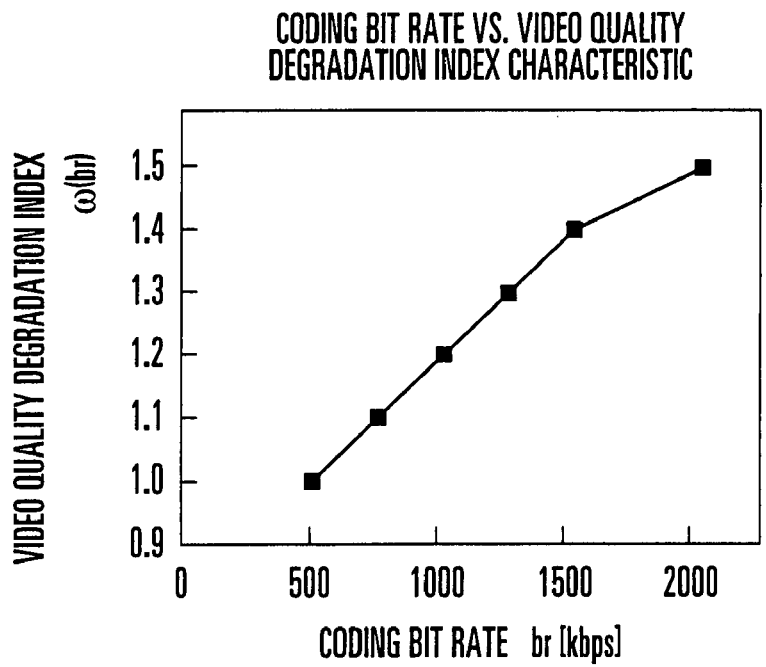
FIG. 8 is a graph showing a coding bit rate vs. video quality degradation index characteristic.

FIG. 8 is a graph showing the coding bit rate vs. video quality degradation index characteristic. Referring to FIG. 8, the abscissa represents the coding bit rate br (kbps), and the ordinate represents the video quality degradation index ω(br). FIG. 8 shows a coding bit rate vs. video quality degradation index characteristic in an estimation model expressed by a Gaussian function. If another estimation model is used, a coding bit rate vs. video quality degradation index characteristic representing a coefficient corresponding to the estimation model is used.

It may be unnecessary to use individual spread widths for frame rate vs. subjective video quality characteristics corresponding to individual coding bit rates depending on the estimation target audiovisual communication service. In this case, a constant is usable as the video quality degradation index ω(br).

[Operation of the First Embodiment]

Figures 9, 10:
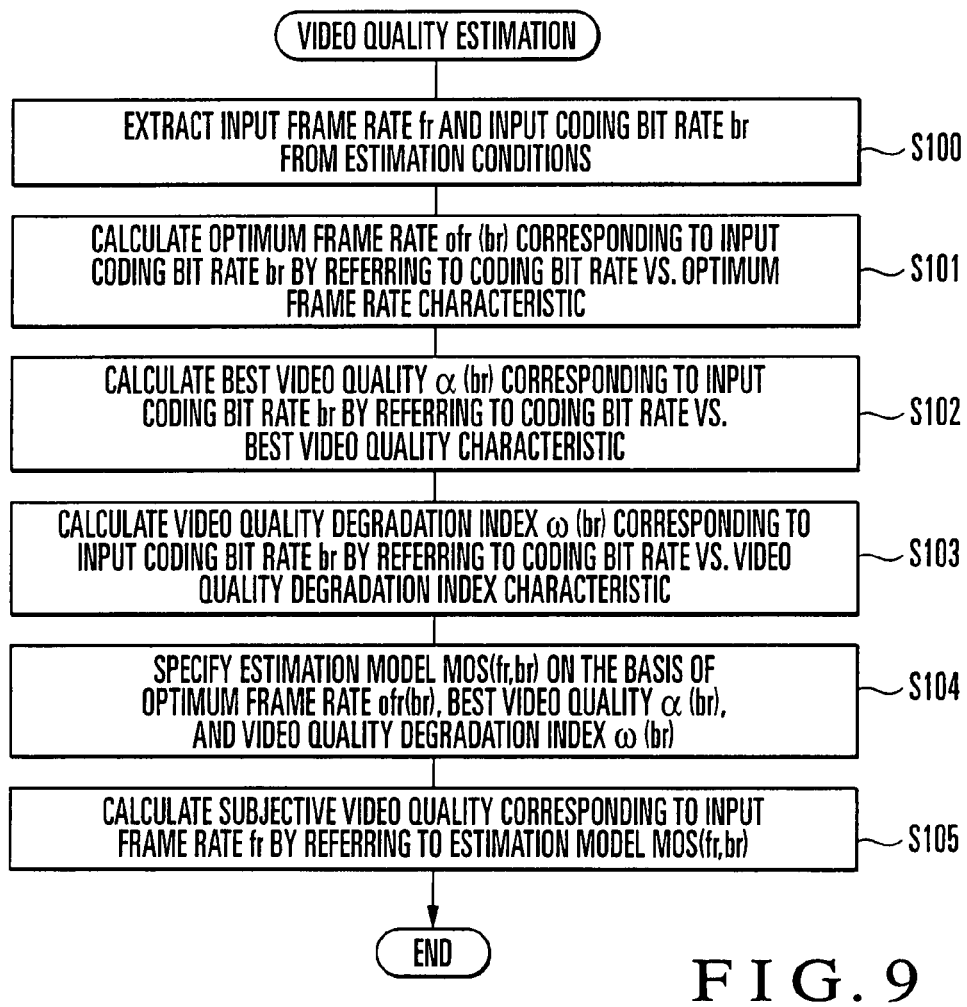
FIG. 9 is a flowchart illustrating the video quality estimation process of the video quality estimation apparatus according to the first embodiment of the present invention.
FIG. 10 is a view showing a structural example of estimation model specifying parameter information.

The operation of the video quality estimation apparatus according to the first embodiment of the present invention will be described next with reference to FIG. 9. FIG. 9 is a flowchart illustrating the video quality estimation process of the video quality estimation apparatus according to the first embodiment of the present invention.

The video quality estimation apparatus 100 starts the video quality estimation process in FIG. 9 in accordance with an instruction operation from the operator or input of the estimation conditions 110. An example will be described here in which the video quality degradation index 132C is used as an estimation model specifying parameter in addition to the optimum frame rate 132A and best video quality 132B. In the video quality estimation apparatus 100, the above-described coding bit rate vs. optimum frame rate characteristic 131A (FIG. 4), coding bit rate vs. best video quality characteristic 131B (FIG. 5), and coding bit rate vs. video quality degradation index characteristic 131C (FIG. 8) are prepared in advance and stored in the storage unit 131M as function expressions.

First, the parameter extraction unit 111 extracts the various estimation conditions 110 related to an evaluation target audiovisual communication service, extracts a frame rate and a coding bit rate related to encoding of an audiovisual medium from the estimation conditions 110, and outputs the input frame rate fr (121A) and input coding bit rate br (121B) as the main parameters 121 (step S100).

The estimation model specifying unit 112 specifies the estimation model 122 representing the relationship between the frame rate and the subjective video quality of the audiovisual medium on the basis of the input coding bit rate 121B of the main parameters 121 output from the parameter extraction unit 111.

More specifically, the optimum frame rate calculation unit 112A calculates the optimum frame rate ofr(br) (132A) corresponding to the input coding bit rate br (121B) by referring to the coding bit rate vs. optimum frame rate characteristic 131A in the storage unit 131M (step S101).

Next, the estimation model specifying unit 112 causes the best video quality calculation unit 112B to calculate the best video quality α(br) (132B) corresponding to the input coding bit rate br (121B) by referring to the coding bit rate vs. best video quality characteristic 131B in the storage unit 131M (step S102).

Similarly, the estimation model specifying unit 112 causes the video quality degradation index calculation unit 112C to calculate the video quality degradation index ω(br) (132C) corresponding to the input coding bit rate br (121B) by referring to the coding bit rate vs. video quality degradation index characteristic 131C in the storage unit 131M (step S103).

After the estimation model specifying parameters 132 are calculated, the estimation model specifying unit 112 causes the estimation model generation unit 112D to substitute the actual values of the estimation model specifying parameters 132 including the optimum frame rate ofr(br), best video quality α(br), and video quality degradation index ω(br) into equation (2) described above, thereby specifying the estimation model MOS(fr,br), i.e., frame rate vs. subjective video quality characteristic (step S104).

Then, the video quality estimation apparatus 100 causes the video quality estimation unit 113 to calculate video quality corresponding to the input frame rate 121A of the main parameters 121 output from the parameter extraction unit 111 by referring to the estimation model 122 specified by the estimation model specifying unit 112, outputs the video quality as the subjective video quality estimation value 123 a viewer actually senses from the audiovisual medium reproduced on the terminal by using the evaluation target audiovisual communication service (step S105), and finishes the series of video quality estimation processes.

As described above, in this embodiment, in estimating subjective video quality corresponding to the main parameters 121 which are input as the input coding bit rate 121B representing the number of coding bits per unit time and the input frame rate 121A representing the number of frames per unit time of an audiovisual medium, the estimation model specifying unit 112 specifies the estimation model 122 representing the relationship between the frame rate and the subjective video quality of the audiovisual medium on the basis of the input coding bit rate 121B. Subjective video quality corresponding to the input frame rate 121A is estimated by using the specified estimation model 122 and output as the estimation value 123.

It is therefore possible to obtain the subjective video quality estimation value 123 corresponding to the input frame rate 121A input as the estimation condition 110 by referring to the estimation model 122 corresponding to the input coding bit rate 121B input as the estimation condition 110.

This allows to obtain specific and useful guidelines for quality design/management to know the set values of the coding bit rate and frame rate and video quality corresponding to them in consideration of the tradeoff between the number of coding bits per unit frame and the frame rate with respect to video quality. The guidelines are highly applicable in quality design of applications and networks before providing a service and quality management after the start of the service.

For example, assume that an audiovisual medium should be distributed at desired video quality. Use of the video quality estimation apparatus 100 of this embodiment enables to specifically grasp which coding bit rate and frame rate should be used to encode a video image captured by a camera to satisfy the desired video quality. Especially, the coding bit rate is often limited by the constraints of a network. In this case, the coding bit rate is fixed, and the video quality estimation apparatus 100 of this embodiment is applied. This makes it possible to easily and specifically grasp the relationship between the frame rate and the video quality.

In the example described in this embodiment, the coding bit rate vs. optimum frame rate characteristic 131A, coding bit rate vs. best video quality characteristic 131B, and coding bit rate vs. video quality degradation index characteristic 131C used to calculate the estimation model specifying parameters 132 are prepared in the form of function expressions and stored in the storage unit 131M in advance. However, the estimation model specifying parameter derivation characteristics 131 used to calculate the estimation model specifying parameters are not limited to function expressions. They may be stored in the storage unit 131M as values corresponding to the input coding bit rate.

FIG. 10 is a view showing a structural example of estimation model specifying parameter information representing the correlation between the input coding bit rate and the estimation model specifying parameters. Each estimation model specifying parameter information contains a set of the input coding bit rate br (121B) and corresponding optimum frame rate ofr(br) (132A), best video quality α(br) (132B), and video quality degradation index ω(br) (132C). The estimation model specifying parameter information is calculated on the basis of the estimation model specifying parameter derivation characteristics 131 and stored in the storage unit 131M in advance.

The estimation model specifying parameters 132 corresponding to the input coding bit rate 121B may be derived by referring to the estimation model specifying parameter information.

Second Embodiment

Figure 11:
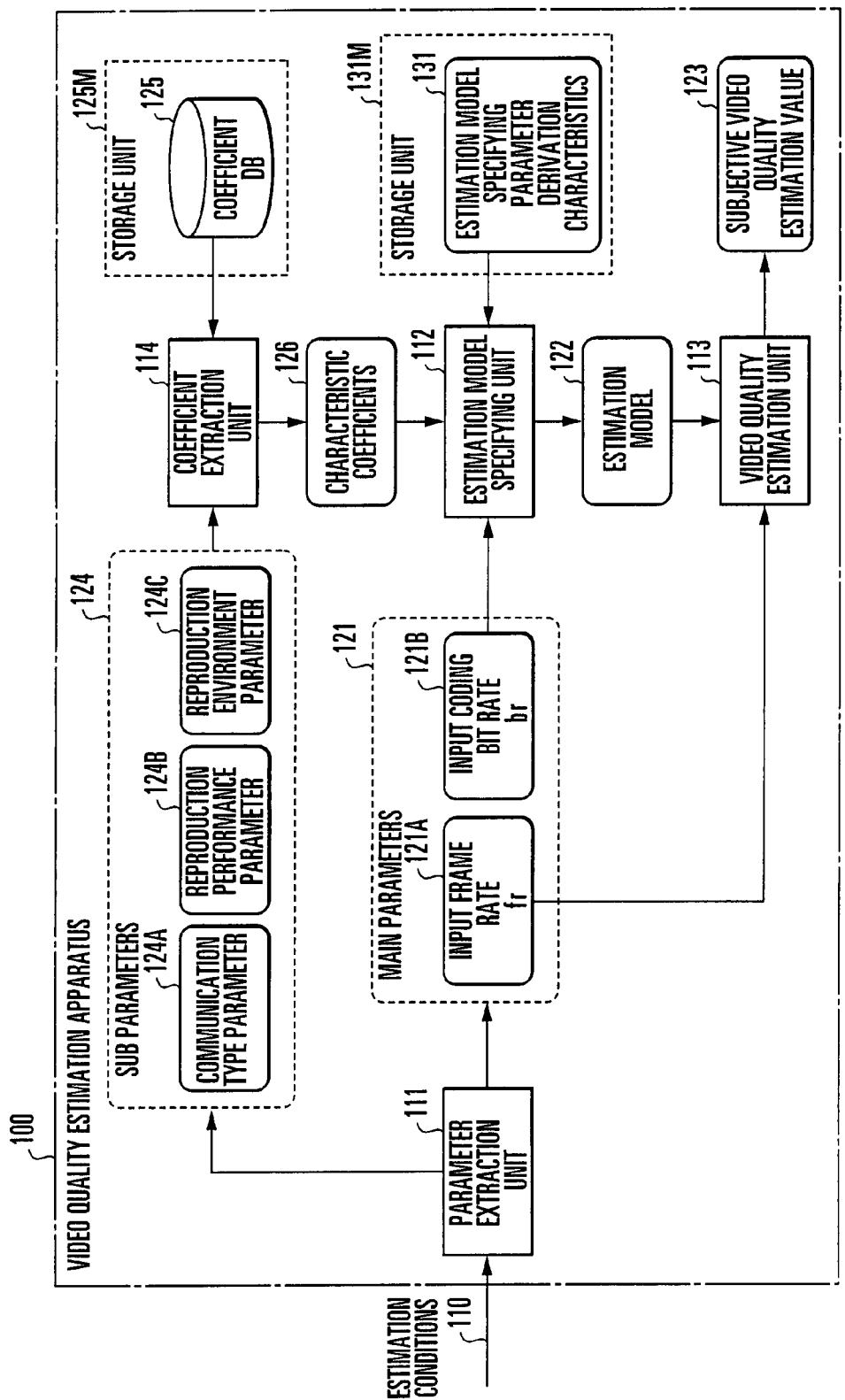
FIG. 11 is a block diagram showing the arrangement of a video quality estimation apparatus according to the second embodiment of the present invention.
Figure 12:
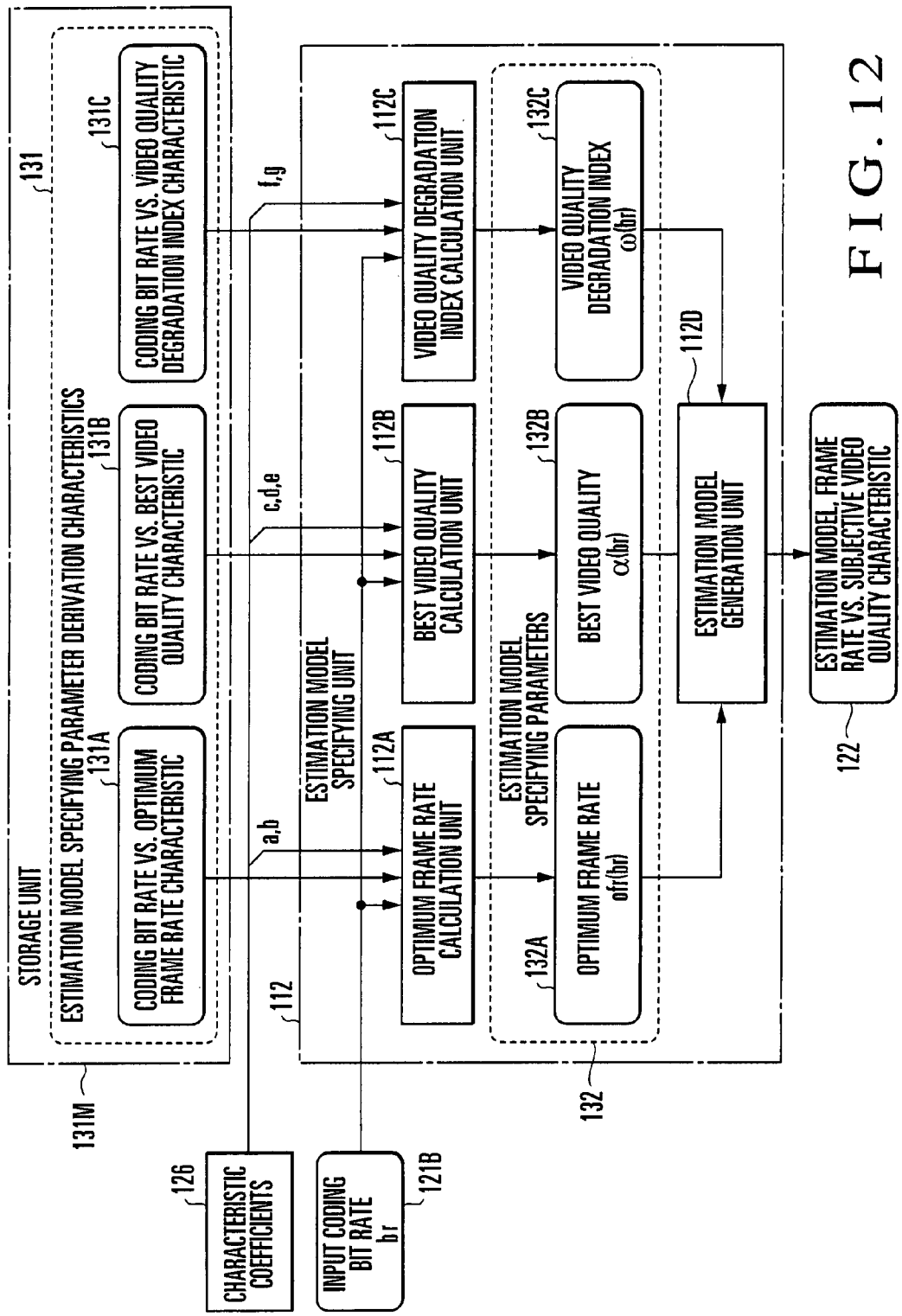
FIG. 12 is a block diagram showing the arrangement of the estimation model specifying unit of the video quality estimation apparatus according to the second embodiment of the present invention.

A video quality estimation apparatus according to the second embodiment of the present invention will be described next with reference to FIGS. 11 and 12. FIG. 11 is a block diagram showing the arrangement of a video quality estimation apparatus according to the second embodiment of the present invention. The same reference numerals as in FIG. 1 described above denote the same or similar parts in FIG. 11. FIG. 12 is a block diagram showing the arrangement of the estimation model specifying unit of the video quality estimation apparatus according to the second embodiment of the present invention. The same reference numerals as in FIG. 2 described above denote the same or similar parts in FIG. 12.

The first embodiment has exemplified a case in which the estimation model specifying parameters 132 corresponding to an input coding bit rate are derived by referring to the estimation model specifying parameter derivation characteristics 131 prepared in advance. In the second embodiment, a case will be described in which estimation model specifying parameter derivation characteristics 131 corresponding to various estimation conditions 110 related to an evaluation target audiovisual communication service are sequentially specified on the basis of, of the estimation conditions 110, the communication type of the audiovisual communication service, the reproduction performance of a terminal that reproduces an audiovisual medium, or the reproduction environment of a terminal that reproduces an audiovisual medium.

Unlike the first embodiment (FIG. 1), a video quality estimation apparatus 100 according to the second embodiment additionally includes a coefficient extraction unit 114 and a coefficient database (to be referred to as a coefficient DB hereinafter) 125.

The coefficient extraction unit 114 has a function of extracting characteristic coefficients 126 corresponding to sub parameters 124 extracted by a parameter extraction unit 111 from the estimation conditions 110 by referring to the coefficient DB 125 in a storage unit 125M (second storage unit).

FIG. 13 is an explanatory view showing an arrangement of the coefficient DB. The coefficient DB 125 is a database showing sets of the various sub parameters 124 and corresponding characteristic coefficients a, b, c, . . . , g (126). The sub parameters 124 include a communication type parameter 124A indicating the communication type of an audiovisual communication service, a reproduction performance parameter 124B indicating the reproduction performance of a terminal that reproduces an audiovisual medium, and a reproduction environment parameter 124C indicating the reproduction environment of a terminal that reproduces an audiovisual medium.

A detailed example of the communication type parameter 124A is "task" that indicates a communication type executed by an evaluation target audiovisual communication service.

Detailed examples of the reproduction performance parameter 124B are "encoding method", "video format", and "key frame" related to encoding of an audiovisual medium and "monitor size" and "monitor resolution" related to the medium reproduction performance of a terminal.

A detailed example of the reproduction environment parameter 124C is "indoor luminance" in reproducing a medium on a terminal.

The sub parameters 124 are not limited to these examples. They can arbitrarily be selected in accordance with the contents of the evaluation target audiovisual communication service or audiovisual medium and need only include at least one of the communication type parameter 124A, reproduction performance parameter 124B, and reproduction environment parameter 124C.

The coefficient extraction unit 114 extracts the characteristic coefficients 126 corresponding to the sub parameters 124 by referring to the coefficient DB 125 in the storage unit 125M prepared in advance. The characteristic coefficients 126 are coefficients to specify the estimation model specifying parameter derivation characteristics to be used to derive estimation model specifying parameters 132.

An estimation model specifying unit 112 specifies the estimation model specifying parameter derivation characteristics 131, i.e., coding bit rate vs. optimum frame rate characteristic 131A, coding bit rate vs. best video quality characteristic 131B, and coding bit rate vs. video quality degradation index characteristic 131C specified by the characteristic coefficients 126 extracted by the coefficient extraction unit 114.

[Estimation Model Specifying Parameter Derivation Characteristics]

The estimation model specifying parameter derivation characteristics 131 used by the estimation model specifying unit 112 will be described next in detail.

The estimation model specifying parameter derivation characteristics 131 can be modeled in the following way by using the characteristic coefficients 126 extracted by the coefficient extraction unit 114 from the coefficient DB 125.

The coding bit rate vs. optimum frame rate characteristic 131A of the estimation model specifying parameter derivation characteristics 131 tends to monotonically increase the optimum frame rate along with the increase in coding bit rate and then converge to a certain maximum frame rate, as shown in FIG. 4 described above. The coding bit rate vs. optimum frame rate characteristic 131A can be modeled by, e.g., a general linear function. Let br be the coding bit rate, ofr(br) be the corresponding optimum frame rate, and a and b be coefficients. In this case, the coding bit rate vs. optimum frame rate characteristic 131A is given by $$\text{ofr}(br) = a + b \cdot br \quad (3)$$

The coding bit rate vs. best video quality characteristic 131B of the estimation model specifying parameter derivation characteristics 131 tends to increase the video quality along with the increase in coding bit rate and then converge to a certain maximum value and decrease the video quality along with the decrease in coding bit rate and then converge to a certain minimum value, as shown in FIG. 5 described above. The coding bit rate vs. best video quality characteristic 131B can be modeled by, e.g., a general logistic function.

Figure 14:
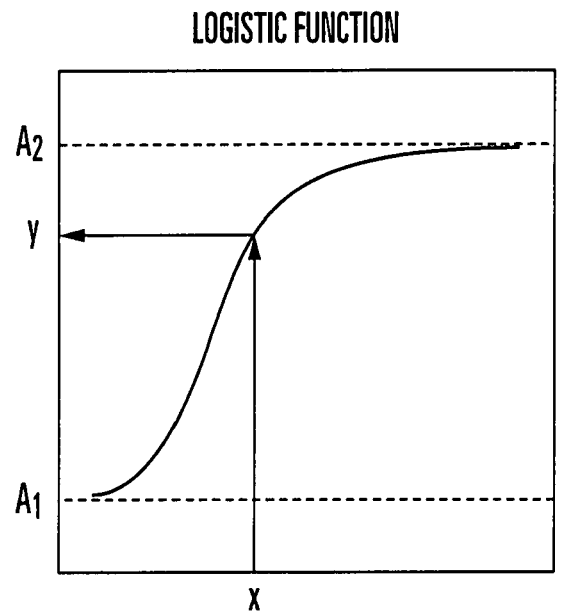
FIG. 14 is an explanatory view showing a logistic function.

FIG. 14 is an explanatory view showing a logistic function. A logistic function monotonically increases a function value y along with the increase in variable x when coefficient p>1. As the variable x decreases, the function value y converges to the minimum value. As the variable x increases, the function value y converges to the maximum value. Let $A_1$ be the minimum value, $A_2$ be the maximum value, and p and $x_0$ be coefficients. In this case, the function value y with respect to the arbitrary variable x is given by equation (4) including a term of the maximum value $A_2$ and a fraction term representing the decrease from the maximum value $A_2$.

$$y = A_2 + \frac{A_1 - A_2}{1 + (x/x_0)^p} \quad (4)$$

When the coding bit rate br is substituted into the variable x, a best video quality α(br) into the corresponding function value y, the characteristic coefficient c into the maximum value $A_2$, "0" into the minimum value $A_1$, the characteristic coefficient d into the variable $x_0$, and the characteristic coefficient e into the coefficient p, the coding bit rate vs. best video quality characteristic 131B is given by $$\alpha(br) = c - \frac{c}{1 + (br/d)^e} \quad (5)$$

Figure 15:
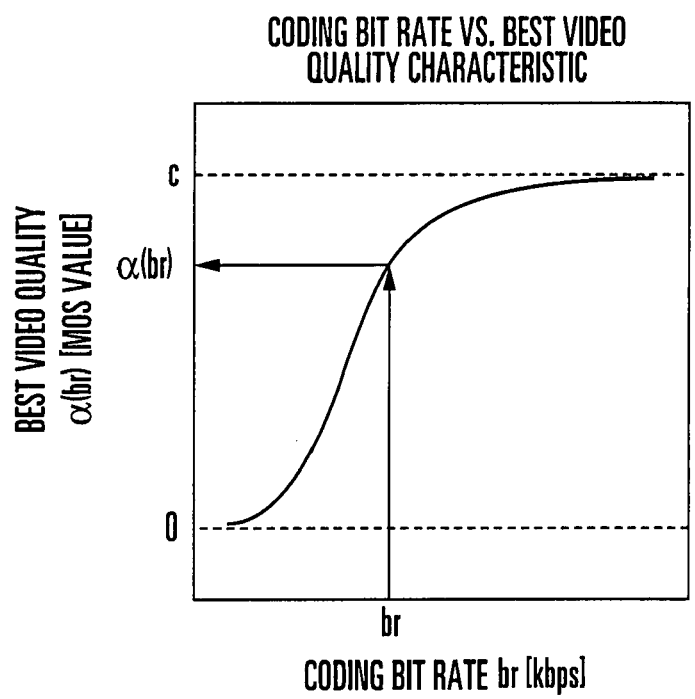
FIG. 15 is an explanatory view showing a coding bit rate vs. best video quality characteristic modeled by a logistic function.

FIG. 15 is an explanatory view showing the coding bit rate vs. best video quality characteristic modeled by a logistic function.

The coding bit rate vs. video quality degradation index characteristic 131C of the estimation model specifying parameter derivation characteristics 131 tends to increase the video quality degradation index along with the increase in coding bit rate and decrease the video quality degradation index along with the decrease in coding bit rate, as shown in FIG. 8 described above. The coding bit rate vs. video quality degradation index characteristic 131C can be modeled by, e.g., a general linear function. Let br be the coding bit rate, ω(br) be the corresponding video quality degradation index, and f and g be coefficients. In this case, the coding bit rate vs. video quality degradation index characteristic 131C is given by $$\omega(br) = f + g \cdot br \quad (6)$$

Modeling of the estimation model specifying parameter derivation characteristics 131 need not always be done by using the above-described linear function or logistic function. Any other function may be used. For example, depending on the contents of the evaluation target audiovisual communication service or audiovisual medium, the network performance, or the contents of the estimation conditions 110, a video quality estimation process based on an input coding bit rate or input frame rate within a relatively limited range suffices. If such local estimation is possible, the estimation model specifying parameter derivation characteristics 131 can be modeled by a simple function such as a linear function, as described above.

If the estimation model specifying parameters largely change with respect to the input coding bit rate or input frame rate, the coding bit rate vs. optimum video quality characteristic 131A may be expressed by using another function such as an exponential function. In modeling using an exponential function, the optimum frame rate ofr(br) and video quality degradation index ω(br) are given by $$\text{ofr}(br) = h + i \cdot \exp(br/j)$$

$$\omega(br) = k + l \cdot \exp(br/m) \quad (7)$$

where h, i, j, k, l, and m are coefficients.

[Operation of the Second Embodiment]

Figure 16:
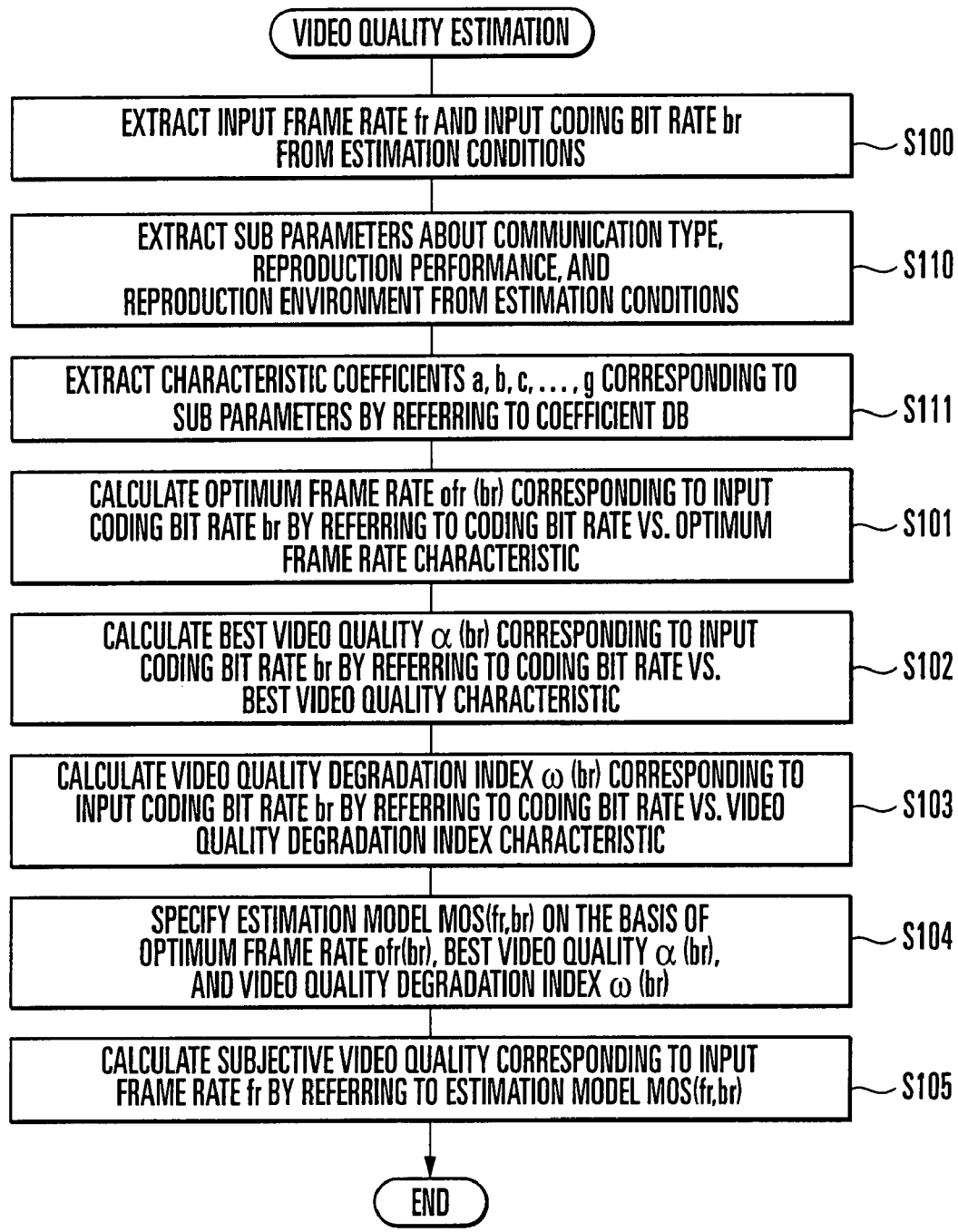
FIG. 16 is a flowchart illustrating the video quality estimation process of the video quality estimation apparatus according to the second embodiment of the present invention.

The operation of the video quality estimation apparatus according to the second embodiment of the present invention will be described next with reference to FIG. 16. FIG. 16 is a flowchart illustrating the video quality estimation process of the video quality estimation apparatus according to the second embodiment of the present invention. The same step numbers as in FIG. 9 described above denote the same or similar steps in FIG. 16.

The video quality estimation apparatus 100 starts the video quality estimation process in FIG. 16 in accordance with an instruction operation from the operator or input of the estimation conditions 110. An example will be described here in which a video quality degradation index 132C is used as an estimation model specifying parameter in addition to an optimum frame rate 132A and a best video quality 132B. Additionally, the communication type parameter 124A, reproduction performance parameter 124B, and reproduction environment parameter 124C are used as the sub parameters 124. The coefficient DB 125 in the storage unit 125M stores the sets of the sub parameters 124 and characteristic coefficients 126 in advance.

First, the parameter extraction unit 111 extracts the various estimation conditions 110 related to an evaluation target audiovisual communication service, extracts a frame rate and a coding bit rate related to encoding of an audiovisual medium from the estimation conditions 110, and outputs an input frame rate fr (121A) and an input coding bit rate br (121B) as main parameters 121 (step S100). The parameter extraction unit 111 also extracts the communication type parameter 124A, reproduction performance parameter 124B, and reproduction environment parameter 124C from the estimation conditions 110 and outputs them as the sub parameters 124 (step S110).

The coefficient extraction unit 114 extracts and outputs the characteristic coefficients a, b, c, . . . , g (126) corresponding to the values of the sub parameters 124 by referring to the coefficient DB 125 in the storage unit 125M (step S111).

Accordingly, the estimation model specifying unit 112 causes the optimum frame rate calculation unit 112A to calculate the optimum frame rate ofr(br) (132A) corresponding to the input coding bit rate br (121B) by referring to the coding bit rate vs. optimum frame rate characteristic 131A which is specified by the characteristic coefficients a and b of the characteristic coefficients 126 (step S101).

Next, the estimation model specifying unit 112 causes the best video quality calculation unit 112B to calculate the best video quality α(br) (132B) corresponding to the input coding bit rate br (121B) by referring to the coding bit rate vs. best video quality characteristic 131B which is specified by the characteristic coefficients c, d, and e of the characteristic coefficients 126 (step S102).

Similarly, the estimation model specifying unit 112 causes the video quality degradation index calculation unit 112C to calculate the video quality degradation index ω(br) (132C) corresponding to the input coding bit rate br (121B) by referring to the coding bit rate vs. video quality degradation index characteristic 131C which is specified by the characteristic coefficients f and g of the characteristic coefficients 126 (step S103).

After the estimation model specifying parameters 132 are calculated, the estimation model specifying unit 112 causes an estimation model generation unit 112D to substitute the actual values of the estimation model specifying parameters 132 including the optimum frame rate ofr(br), best video quality α(br), and video quality degradation index (br) into equation (2) described above, thereby specifying an estimation model MOS(fr,br), i.e., frame rate vs. subjective video quality characteristic (step S104).

Then, the video quality estimation apparatus 100 causes a video quality estimation unit 113 to calculate video quality corresponding to the input frame rate 121A of the main parameters 121 output from the parameter extraction unit 111 by referring to an estimation model 122 specified by the estimation model specifying unit 112, outputs the video quality as a subjective video quality estimation value 123 of subjective video quality a viewer actually senses from the audiovisual medium reproduced on the terminal by using the evaluation target audiovisual communication service (step S105), and finishes the series of video quality estimation processes.

As described above, in this embodiment, the coefficient extraction unit 114 extracts, from the coefficient DB 125 in the storage unit 125M, the characteristic coefficients 126 corresponding to the sub parameters 124 which are extracted by the parameter extraction unit 111 and include at least one of the communication type parameter 124A, reproduction performance parameter 124B, and reproduction environment parameter 124C. The estimation model specifying unit 112 calculates the estimation model specifying parameters 132 corresponding to the input coding bit rate 121B on the basis of the estimation model specifying parameter derivation characteristics 131 specified by the characteristic coefficients 126. It is therefore possible to derive the estimation model specifying parameters 132 based on the specific properties of the evaluation target audiovisual communication service or terminal. This improves the video quality estimation accuracy.

Especially, in estimating video quality in the prior art, a video quality estimation model needs to be prepared for each encoding method or terminal used in an evaluation target audiovisual communication service. However, according to this embodiment, the video quality estimation model does not depend on the encoding method or terminal. The same video quality estimation model can be used only by referring to the coefficients to be used in the video quality estimation model in accordance with the encoding method or terminal. It is therefore possible to flexibly cope with audiovisual communication services in different environments.

Figure 17:
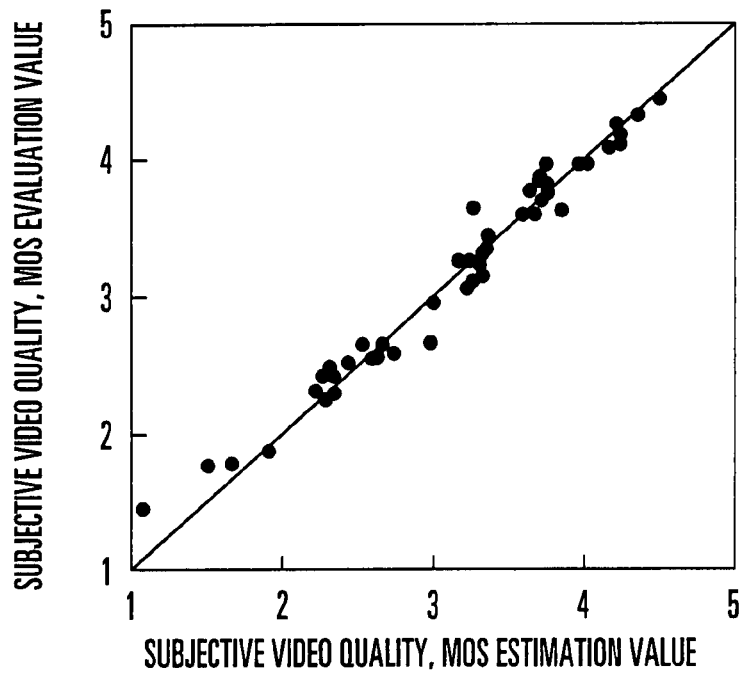
FIG. 17 is a graph showing the estimation accuracy of a video quality estimation apparatus using the embodiment.
Figure 18:
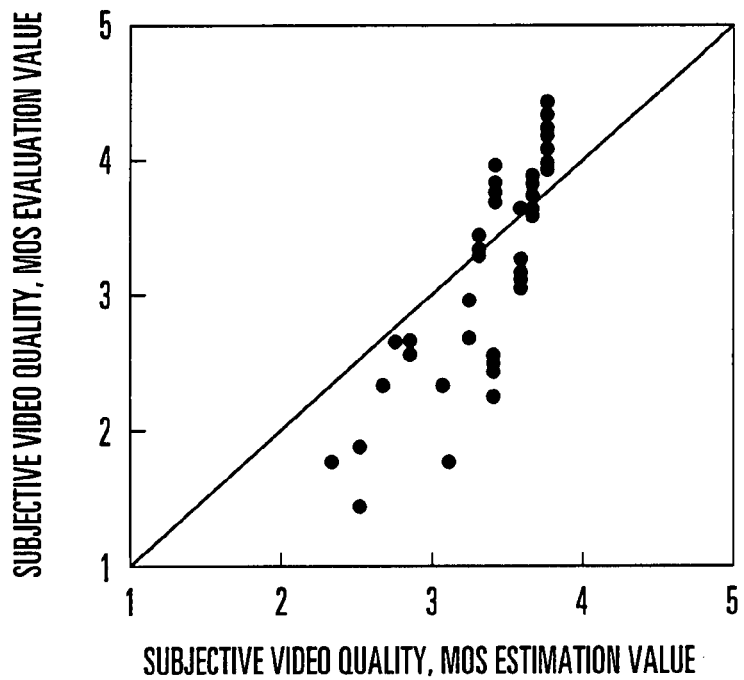
FIG. 18 is a graph showing the estimation accuracy of a conventional video quality estimation apparatus.

FIG. 17 is a graph showing the estimation accuracy of a video quality estimation apparatus using this embodiment. FIG. 18 is a graph showing the estimation accuracy of a conventional video quality estimation apparatus based on reference 2. Referring to FIGS. 17 and 18, the abscissa represents the estimation value (MOS value) of subjective video quality estimated by using the video quality estimation apparatus, and the ordinate represents the evaluation value (MOS value) of subjective video quality actually opinion-evaluated by a viewer. The error between the evaluation value and the estimation value is smaller, and the estimation accuracy is higher in FIG. 17 than in FIG. 18. These are comparison results under specific estimation conditions. Similar comparison results have been confirmed even when another encoding method or terminal was used.

Third Embodiment

Figure 19:
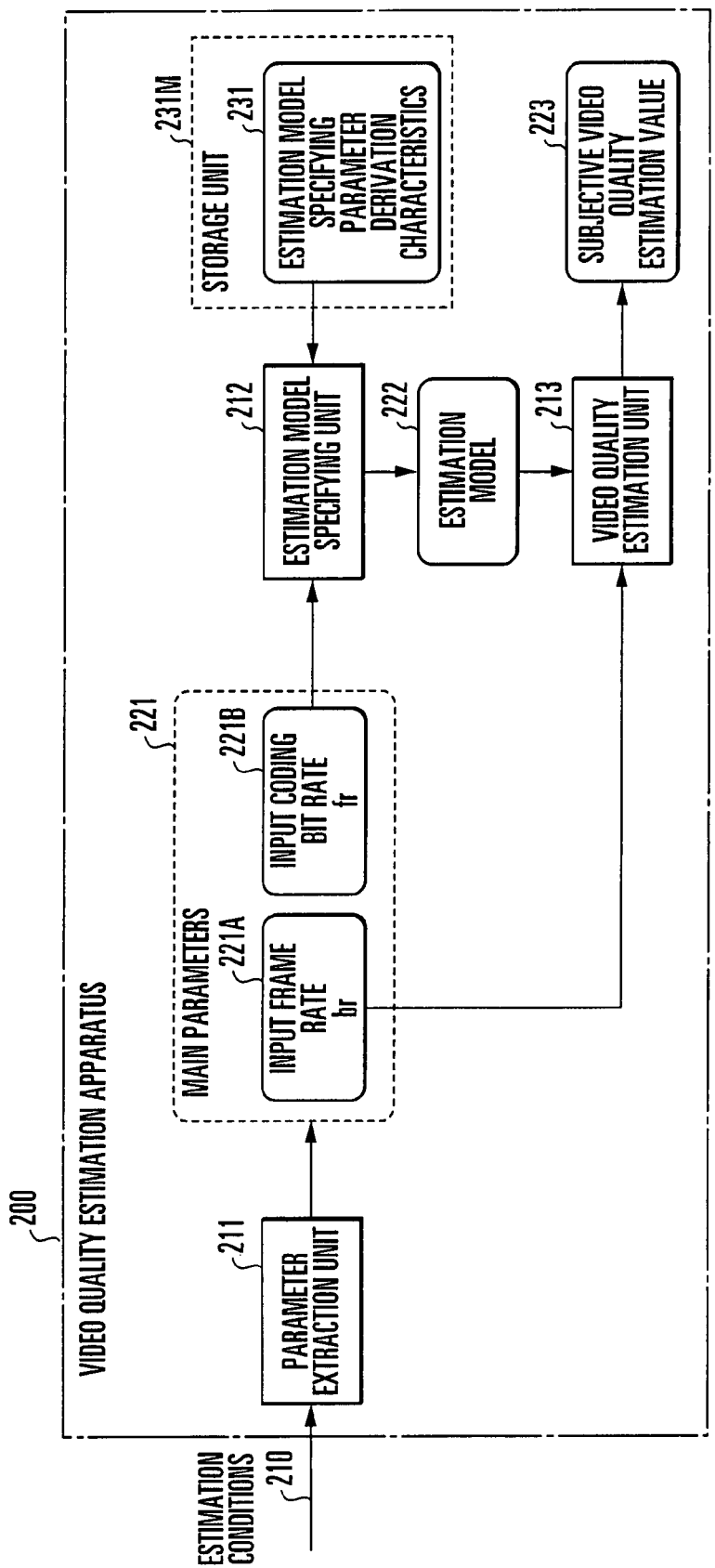
FIG. 19 is a block diagram showing the arrangement of a video quality estimation apparatus according to the third embodiment of the present invention.

A video quality estimation apparatus according to the third embodiment of the present invention will be described first with reference to FIG. 19. FIG. 19 is a block diagram showing the arrangement of the video quality estimation apparatus according to the third embodiment of the present invention.

A video quality estimation apparatus 200 is formed from an information processing apparatus such as a computer that calculates input information. In audiovisual communication for transmitting an audiovisual medium encoded into a plurality of frames to an arbitrary terminal via a communication network, the video quality estimation apparatus 200 inputs estimation conditions about the audiovisual medium and calculates, by using a predetermined estimation model, the estimation value of subjective video quality a viewer actually senses from the audiovisual medium reproduced on the terminal.

In this embodiment, in estimating subjective video quality corresponding to main parameters which are input as an input coding bit rate representing the number of coding bits per unit time and an input frame rate representing the number of frames per unit time of an audiovisual medium, an estimation model representing the relationship between the coding bit rate and the subjective video quality of the audiovisual medium is specified on the basis of the input frame rate. Subjective video quality corresponding to the input coding bit rate is estimated by using the specified estimation model and output as an estimation value.

[Video Quality Estimation Apparatus]

Figure 20:
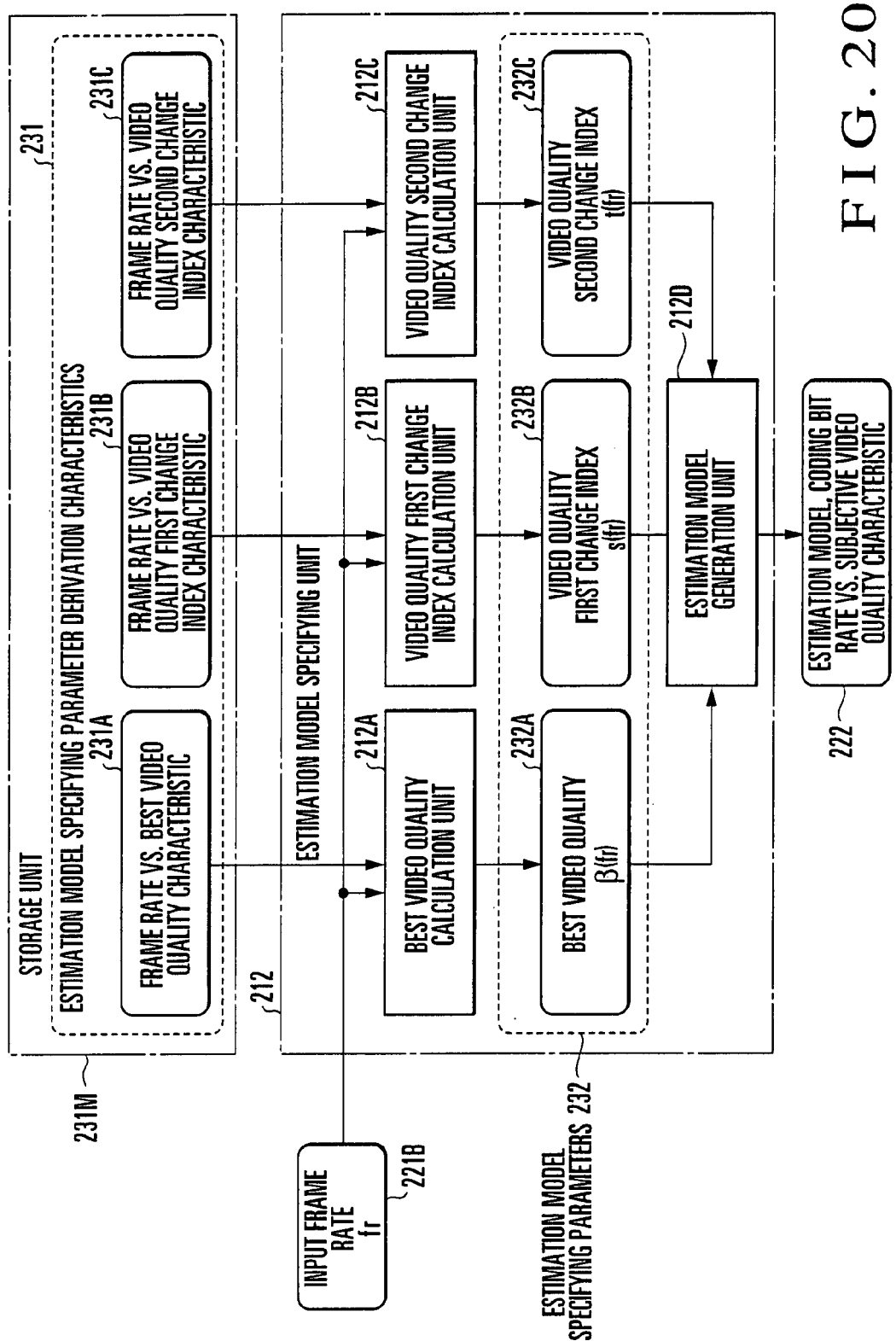
FIG. 20 is a block diagram showing the arrangement of the estimation model specifying unit of the video quality estimation apparatus according to the third embodiment of the present invention.

The arrangement of the video quality estimation apparatus according to the third embodiment of the present invention will be described next in detail with reference to FIGS. 19 and 20. FIG. 20 is a block diagram showing the arrangement of the estimation model specifying unit of the video quality estimation apparatus according to the third embodiment of the present invention.

The video quality estimation apparatus 200 includes a parameter extraction unit 211, estimation model specifying unit 212, and video quality estimation unit 213 as main functional units. These functional units may be implemented either by dedicated calculation circuits or by providing a microprocessor such as a CPU and its peripheral circuits and making the microprocessor read out and execute a program prepared in advance to cause the hardware and program to cooperate with each other. Storage units (to be described later) including storage devices such as a memory and a hard disk store pieces of process information used in these functional units. The pieces of process information are exchanged between the functional units via a storage unit (not shown) including a storage device. The program may be stored in the storage unit. The video quality estimation apparatus 200 also includes various fundamental components such as a storage device, operation input device, and screen display device, like a general information processing apparatus.

The parameter extraction unit 211 has a function of extracting various kinds of estimation conditions 210 related to an evaluation target audiovisual communication service, a function of extracting a coding bit rate and a frame rate related to encoding of an audiovisual medium from the estimation conditions 210, and a function of outputting the extracted frame rate and coding bit rate as main parameters 221 including an input coding bit rate br (221A) and an input frame rate fr (221B). The operator can input the estimation conditions 210 by using an operation input device such as a keyboard. Alternatively, the estimation conditions 210 may be either acquired from an external device, recording medium, or communication network by using a data input/output device for inputting/outputting data or measured from an actual audiovisual communication service.

The estimation model specifying unit 212 has a function of calculating, on the basis of the input frame rate 221B of the main parameters 221 output from the parameter extraction unit 211, estimation model specifying parameters 232 to specify an estimation model 222 representing the relationship between the coding bit rate and the subjective video quality of an audiovisual medium.

The video quality estimation unit 213 has a function of estimating, by referring to the estimation model 222 specified by the estimation model specifying unit 212, subjective video quality corresponding to the input coding bit rate 221A of the main parameters 221 and outputting the subjective video quality as a desired subjective video quality estimation value 223.

The estimation model specifying unit 212 also includes several functional units, as shown in FIG. 20. The main functional units for calculating the estimation model specifying parameters 232 include a best video quality calculation unit 212A, video quality first change index calculation unit 212B, video quality second change index calculation unit 212C, and estimation model generation unit 212D.

The estimation model specifying parameters 232 are values which specify the shapes of functions to be used as the estimation model 222. In this embodiment, at least the best video quality, video quality first change index, and video quality second change index to be described below are used as the estimation model specifying parameters 232. Another parameter may be added to the estimation model specifying parameters 232.

The best video quality calculation unit 212A has a function of calculating, as one of the estimation model specifying parameters 232, best video quality $\beta(fr)$ (232A) representing the best value of the subjective video quality of an audiovisual medium transmitted at the input frame rate 221B by referring to a frame rate vs. best video quality characteristic 231A in a storage unit 231M (third storage unit).

The video quality first change index calculation unit 212B has a function of calculating, as one of the estimation model specifying parameters 232, a video quality first change index s(fr) (232B) representing the degree of change (degradation) from the best video quality 232A representing the best value of the subjective video quality of an audiovisual medium transmitted at the input frame rate 221B by referring to a frame rate vs. video quality first change index characteristic 231B in the storage unit 231M.

The video quality second change index calculation unit 212C has a function of calculating, as one of the estimation model specifying parameters 232, a video quality second change index t(fr) (232C) representing the degree of change (degradation) from the best video quality 232A representing the best value of the subjective video quality of an audiovisual medium transmitted at the input frame rate 221B by referring to a frame rate vs. video quality second change index characteristic 231C in the storage unit 231M.

The frame rate vs. best video quality characteristic 231A, frame rate vs. video quality first change index characteristic 231B, and frame rate vs. video quality second change index characteristic 231C are prepared as estimation model specifying parameter derivation characteristics 231 and stored in the storage unit 231M (third storage unit) in advance.

The estimation model generation unit 212D has a function of generating the estimation model 222 to estimate subjective video quality corresponding to the input frame rate 221B of the main parameters 221 by substituting, into a predetermined function expression, the values of the estimation model specifying parameters 232 including the best video quality $\beta(fr)$ calculated by the best video quality calculation unit 212A, the video quality first change index s(fr) calculated by the video quality first change index calculation unit 212B, and the video quality second change index t(fr) calculated by the video quality second change index calculation unit 212C.

[Subjective Video Quality Characteristic]

Figure 21:
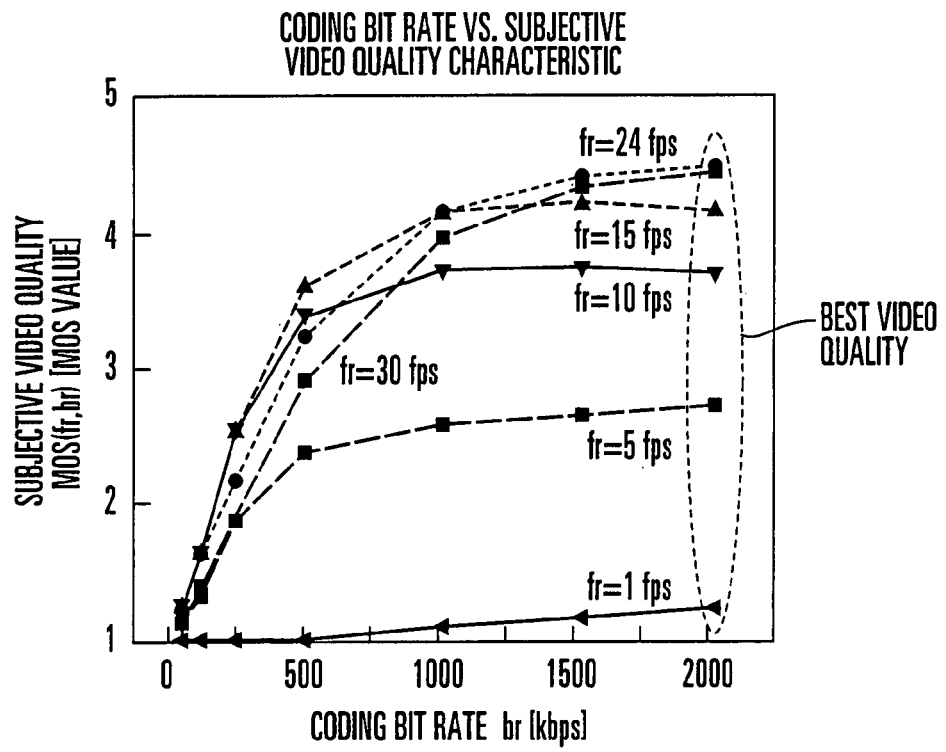
FIG. 21 is a graph showing a coding bit rate vs. subjective video quality characteristic of an audiovisual medium in an audiovisual communication service.

The subjective video quality characteristic of an audiovisual medium in an audiovisual communication service will be described next with reference to FIG. 21. FIG. 21 is a graph showing the coding bit rate vs. subjective video quality characteristic of an audiovisual medium in an audiovisual communication service. Referring to FIG. 21, the abscissa represents a coding bit rate br (kbps), and the ordinate represents a subjective video quality value MOS(fr, br) (MOS value). FIG. 21 shows characteristics corresponding to the respective frame rates fr.

The number of coding bits per unit frame and the frame rate have a tradeoff relationship with respect to the subjective video quality of an audiovisual medium.

More specifically, in providing a video image encoded at a certain coding bit rate, when the video image is encoded at a high frame rate, the temporal video quality can be improved because a smooth video image is obtained. On the other hand, spatial image degradation may become noticeable because of the decrease in the number of coding bits per unit frame, resulting in poor video quality. When the video image is encoded by using a large number of coding bits per unit frame, spatial image degradation improves so that a higher video quality can be obtained. However, since the number of frames per unit time decreases, temporal frame drop with a jerky effect may take place, resulting in poor video quality.

When the frame rate does not change, the video quality has monotonically increases along with the increase in coding bit rate and converges to the best video quality of the audiovisual medium transmitted at the frame rate, as shown in FIG. 21. For example, when frame rate fr=10 [fps], the subjective video quality characteristic monotonically increases along with the increase in coding bit rate br and converges to best video quality=3.8 [MOS] near coding bit rate br=1000 [kbps].

The subjective video quality characteristic exhibits a similar shape even when the frame rate changes. The coordinate position of each subjective video quality characteristic can be specified by the estimation model specifying parameters including the best video quality and the degree of change corresponding to the best video quality.

This embodiment places focus on such property of the subjective video quality characteristic. The estimation model specifying unit 212 specifies the estimation model 222 representing the relationship between the coding bit rate and the subjective video quality of an audiovisual medium on the basis of the input frame rate 221B. The video quality estimation unit 213 estimates the subjective video quality estimation value 223 corresponding to the input coding bit rate 221A by using the estimation model 222 specified by the estimation model specifying unit 212.

[Estimation Model]

The estimation model used by the estimation model specifying unit 212 and derivation of the estimation model specifying parameter will be described next in detail.

The coding bit rate vs. subjective video quality characteristic shown in FIG. 21 tends to monotonically increase along will the increase in coding bit rate and converge to the best video quality of the audiovisual medium transmitted at the frame rate. The coding bit rate vs. subjective video quality characteristic can be modeled by, e.g., a general logistic function.

Figure 22:
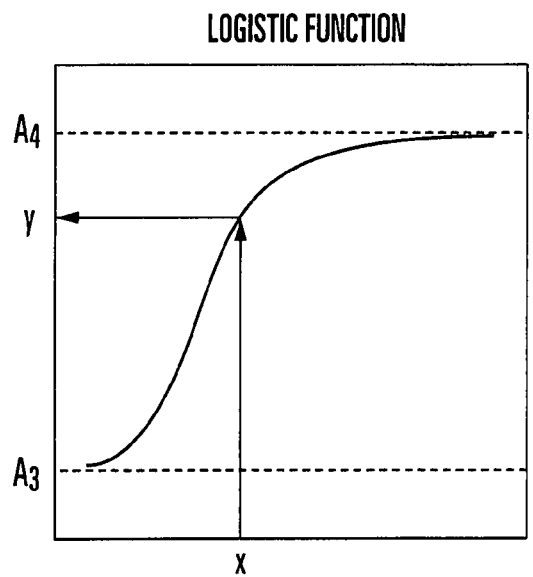
FIG. 22 is an explanatory view showing a logistic function.

FIG. 22 is an explanatory view showing a logistic function. A logistic function monotonically increases a function value y along with the increase in variable x when coefficient r>1. As the variable x decreases, the function value y converges to the minimum value. As the variable x increases, the function value y converges to the maximum value. Let $A_3$ be the minimum value, $A_4$ be the maximum value, and q and r be coefficients. In this case, the function value y with respect to the arbitrary variable x is given by equation (8) including a term of the maximum value $A_4$ and a fraction term representing the decrease from the maximum value $A_4$.

$$y = A_4 + \frac{A_3 - A_4}{1 + (x/q)^r} \quad (8)$$

When the coding bit rate br is substituted into the variable x, the subjective video quality MOS(fr,br) into the corresponding function value y, the best video quality β(fr) into the maximum value $A_4$, "1" into the minimum value $A_3$, the video quality first change index s(fr) into the coefficient q, and the video quality second change index t(fr) into the coefficient r, the subjective video quality MOS corresponding to the arbitrary coding bit rate br is given by $$MOS(fr, br) = \beta(fr) + \frac{1}{1 + (br/s(fr))^{t(fr)}} \quad (9)$$

Figure 23:
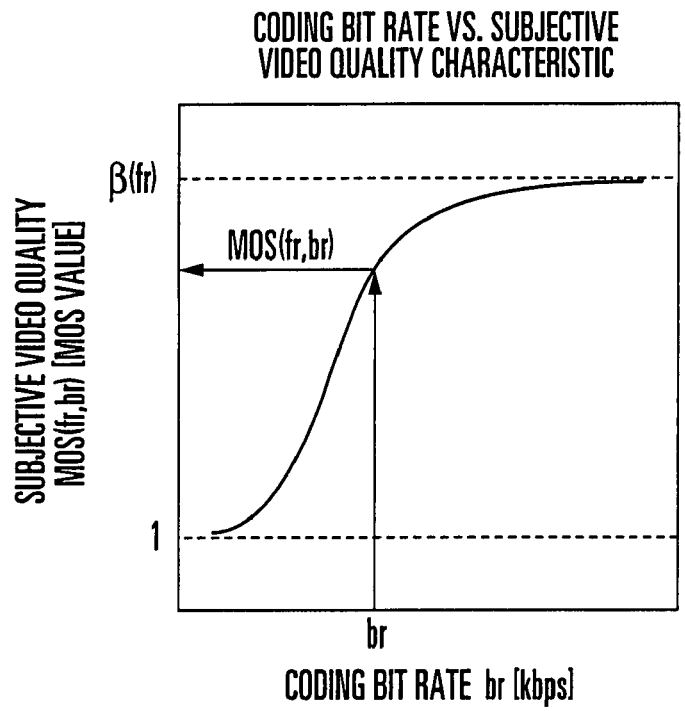
FIG. 23 is an explanatory view showing a coding bit rate vs. subjective video quality characteristic modeled by a logistic function.

As a result, the estimation model 222, i.e., coding bit rate vs. subjective video quality characteristic corresponding to the input frame rate 221B can be specified. FIG. 23 is an explanatory view showing the coding bit rate vs. subjective video quality characteristic modeled by the logistic function.

Hence, when the estimation model specifying unit 212 should specify the estimation model 222 representing the relationship between the coding bit rate and the subjective video quality of an audiovisual medium on the basis of the input frame rate 221B, it is necessary to derive the best video quality 232A, video quality first change index 232B, and video quality second change index 232C as the estimation model specifying parameters corresponding to the input frame rate 221B. Especially, the video quality first change index s(fr) and video quality second change index t(fr) are used to calculate the decrease from the maximum value $A_4$ in the fraction term of the logistic function, i.e., the change (degradation) from the best video quality β(fr) and are necessary for specifying the estimation model 222 as change indices representing the degree of change related to the subjective video quality at the frame rate fr.

In this embodiment, the frame rate vs. best video quality characteristic 231A, frame rate vs. video quality first change index characteristic 231B, and frame rate vs. video quality second change index characteristic 231C to be described below are prepared in advance as the estimation model specifying parameter derivation characteristics 231. The estimation model specifying parameters 232 corresponding to the input frame rate 221B are derived by referring to these characteristics.

In the characteristics shown in FIG. 21, the frame rate of a transmitted audiovisual medium and the corresponding best video quality have a relationship with such a tendency that along with the increase in frame rate fr, the best video quality β(fr) increases and converges to a certain maximum value (maximum subjective video quality value).

Figure 24:
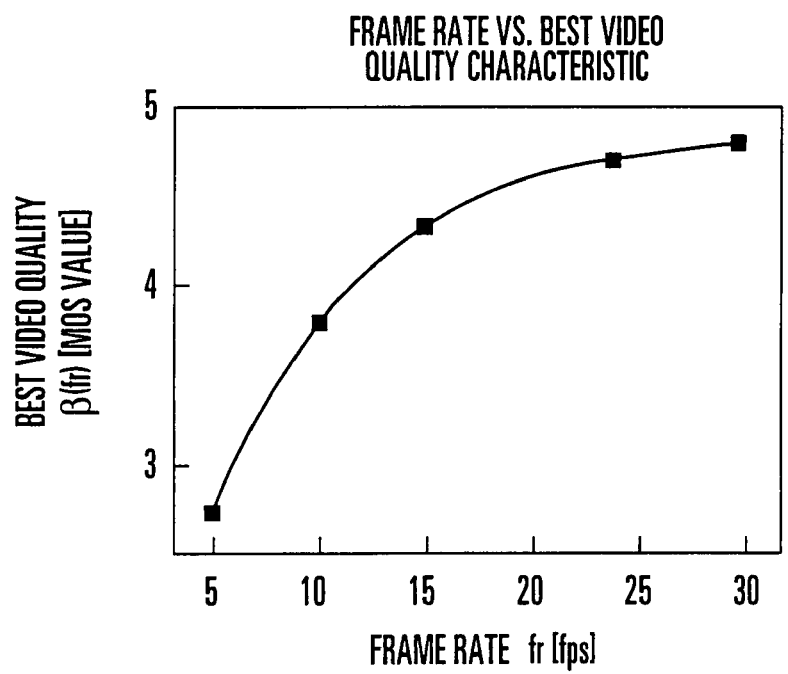
FIG. 24 is a graph showing a frame rate vs. best video quality characteristic.

FIG. 24 is a graph showing the frame rate vs. best video quality characteristic. Referring to FIG. 24, the abscissa represents the frame rate fr (fps), and the ordinate represents the best video quality β(fr) (MOS value).

The frame rate of a transmitted audiovisual medium and the corresponding video quality first change index have a relationship with such a tendency that along with the increase in frame rate, the video quality first change index monotonically increases.

Figure 25:
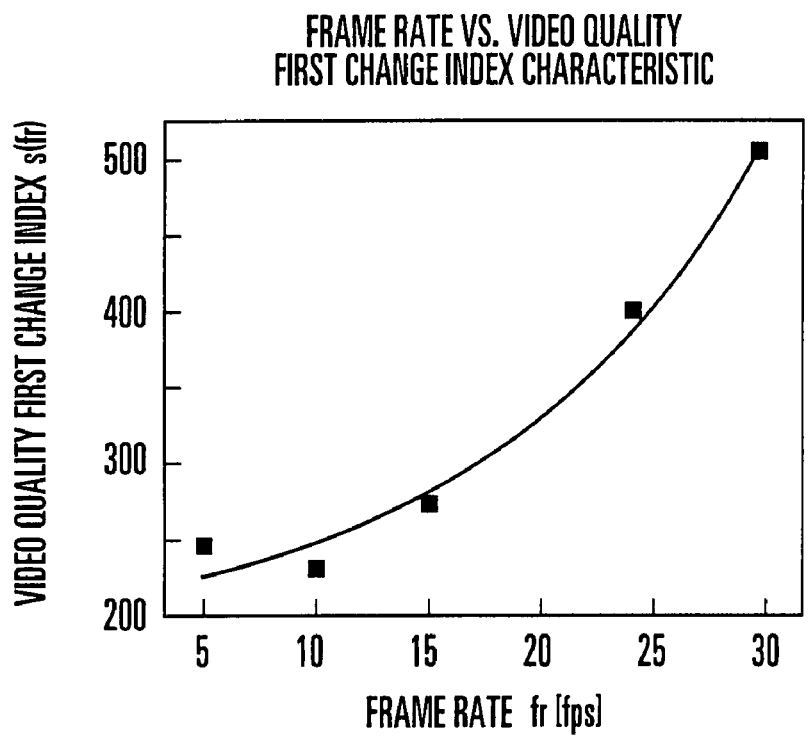
FIG. 25 is a graph showing a frame rate vs. video quality first change index characteristic.

FIG. 25 is a graph showing the frame rate vs. video quality first change index characteristic. Referring to FIG. 25, the abscissa represents the frame rate fr (fps), and the ordinate represents the video quality first change index s(fr).

The frame rate of a transmitted audiovisual medium and the corresponding video quality second change index have a relationship with such a tendency that along with the increase in frame rate, the video quality second change index monotonically decreases.

Figure 26:
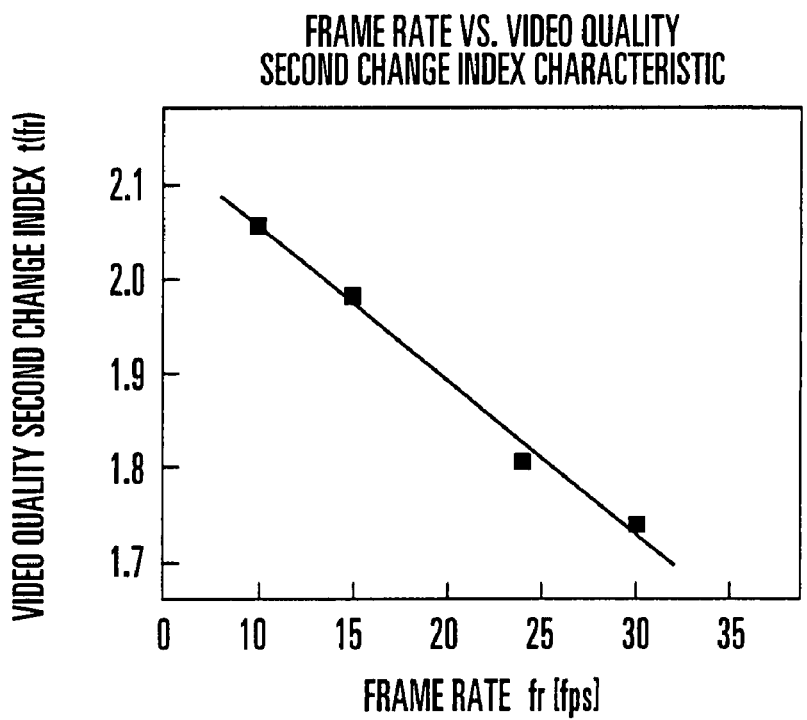
FIG. 26 is a graph showing a frame rate vs. video quality second change index characteristic.

FIG. 26 is a graph showing the frame rate vs. video quality second change index characteristic. Referring to FIG. 26, the abscissa represents the frame rate fr (fps), and the ordinate represents the video quality second change index t(fr).

[Operation of the Third Embodiment]

Figures 27, 28:
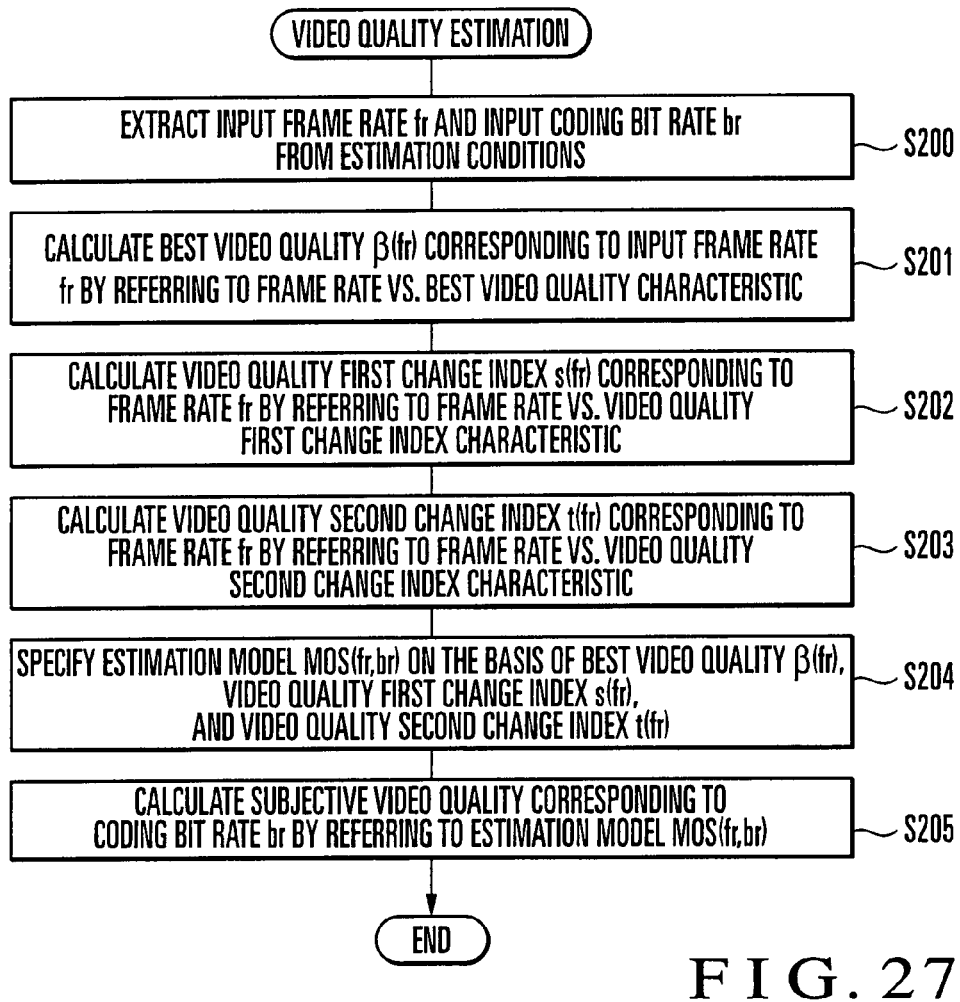
FIG. 27 is a flowchart illustrating the video quality estimation process of the video quality estimation apparatus according to the third embodiment of the present invention.
FIG. 28 is a view showing a structural example of estimation model specifying parameter information.

The operation of the video quality estimation apparatus according to the third embodiment of the present invention will be described next with reference to FIG. 27. FIG. 27 is a flowchart illustrating the video quality estimation process of the video quality estimation apparatus according to the third embodiment of the present invention.

The video quality estimation apparatus 200 starts the video quality estimation process in FIG. 27 in accordance with an instruction operation from the operator or input of the estimation conditions 210. In the video quality estimation apparatus 200, the above-described frame rate vs. best video quality characteristic 231A (FIG. 24), frame rate vs. video quality first change index characteristic 231B (FIG. 25), and frame rate vs. video quality second change index characteristic 231C (FIG. 26) are prepared in advance and stored in the storage unit 231M as function expressions.

First, the parameter extraction unit 211 extracts the various estimation conditions 210 related to an evaluation target audiovisual communication service, extracts a coding bit rate and a frame rate related to encoding of an audiovisual medium from the estimation conditions 210, and outputs the input coding bit rate br (221A) and input frame rate fr (221B) as the main parameters 221 (step S200).

The estimation model specifying unit 212 specifies the estimation model 222 representing the relationship between the coding bit rate and the subjective video quality of the audiovisual medium on the basis of the input frame rate 221B of the main parameters 221 output from the parameter extraction unit 211.

More specifically, the best video quality calculation unit 212A calculates the best video quality β(fr) (232A) corresponding to the input frame rate fr (221B) by referring to the frame rate vs. best video quality characteristic 231A in the storage unit 231M (step S201).

Next, the estimation model specifying unit 212 causes the video quality first change index calculation unit 212B to calculate the video quality first change index s(fr) (232B) corresponding to the input frame rate fr (221B) by referring to the frame rate vs. video quality first change index characteristic 231B in the storage unit 231M (step S202).

Similarly, the estimation model specifying unit 212 causes the video quality second change index calculation unit 212C to calculate the video quality second change index t(fr) (232C) corresponding to the input frame rate fr (221B) by referring to the frame rate vs. video quality second change index characteristic 231C in the storage unit 231M (step S203).

After the estimation model specifying parameters 232 are calculated, the estimation model specifying unit 212 causes the estimation model generation unit 212D to substitute the actual values of the estimation model specifying parameters 232 including the best video quality β(fr), video quality first change index s(fr), and video quality second change index t(fr) into equation (9) described above, thereby specifying the estimation model 222, i.e., coding bit rate vs. subjective video quality characteristic (step S204).

Then, the video quality estimation apparatus 200 causes the video quality estimation unit 213 to calculate video quality corresponding to the input coding bit rate 221A of the main parameters 221 output from the parameter extraction unit 211 by referring to the estimation model 222 specified by the estimation model specifying unit 212, outputs the video quality as the subjective video quality estimation value 223 a viewer actually senses from the audiovisual medium reproduced on the terminal by using the evaluation target audiovisual communication service (step S205), and finishes the series of video quality estimation processes.

As described above, in this embodiment, in estimating subjective video quality corresponding to the main parameters 221 which are input as the input coding bit rate 221A representing the number of coding bits per unit time and the input frame rate 221B representing the number of frames per unit time of an audiovisual medium, the estimation model specifying unit 212 specifies the estimation model 222 representing the relationship between the coding bit rate and the subjective video quality of the audiovisual medium on the basis of the input frame rate 221B. Subjective video quality corresponding to the input coding bit rate 221A is estimated by using the specified estimation model 222 and output as the subjective video quality estimation value 223.

It is therefore possible to obtain the subjective video quality estimation value 223 corresponding to the input coding bit rate 221A input as the estimation condition 210 by referring to the estimation model 222 corresponding to the input frame rate 221B input as the estimation condition 210.

This allows to obtain specific and useful guidelines for quality design/management to know the set values of the coding bit rate and frame rate and video quality corresponding to them in consideration of the tradeoff between the number of coding bits per unit frame and the frame rate with respect to video quality. The guidelines are highly applicable in quality design of applications and networks before providing a service and quality management after the start of the service.

For example, assume that an audiovisual medium should be distributed at desired video quality. Use of the video quality estimation apparatus 200 of this embodiment enables to specifically grasp which coding bit rate and frame rate should be used to encode a video image captured by a camera to satisfy the desired video quality. Especially, the coding bit rate is often limited by the constraints of a network. In this case, the coding bit rate is fixed, and the video quality estimation apparatus 200 of this embodiment is applied. This makes it possible to easily and specifically grasp the relationship between the frame rate and the video quality.

In the example described in this embodiment, the frame rate vs. best video quality characteristic 231A, frame rate vs. video quality first change index characteristic 231B, and frame rate vs. video quality second change index characteristic 231C used to calculate the estimation model specifying parameters 232 are prepared in the form of function expressions and stored in the storage unit 231M in advance. However, the estimation model specifying parameter derivation characteristics 231 used to calculate the estimation model specifying parameters are not limited to function expressions. They may be stored in the storage unit 231M as values corresponding to the input frame rate.

FIG. 28 is a view showing a structural example of estimation model specifying parameter information representing the correlation between the input frame rate and the estimation model specifying parameters. Each estimation model specifying parameter information contains a set of the input frame rate fr (221B) and corresponding best video quality β(fr) (232A), video quality first change index s(fr) (232B), and video quality second change index t(fr) (232C). The estimation model specifying parameter information is calculated on the basis of the estimation model specifying parameter derivation characteristics 231 and stored in the storage unit 231M in advance.

The estimation model specifying parameters 232 corresponding to the input frame rate 221B may be derived by referring to the estimation model specifying parameter information.

Fourth Embodiment

Figure 29:
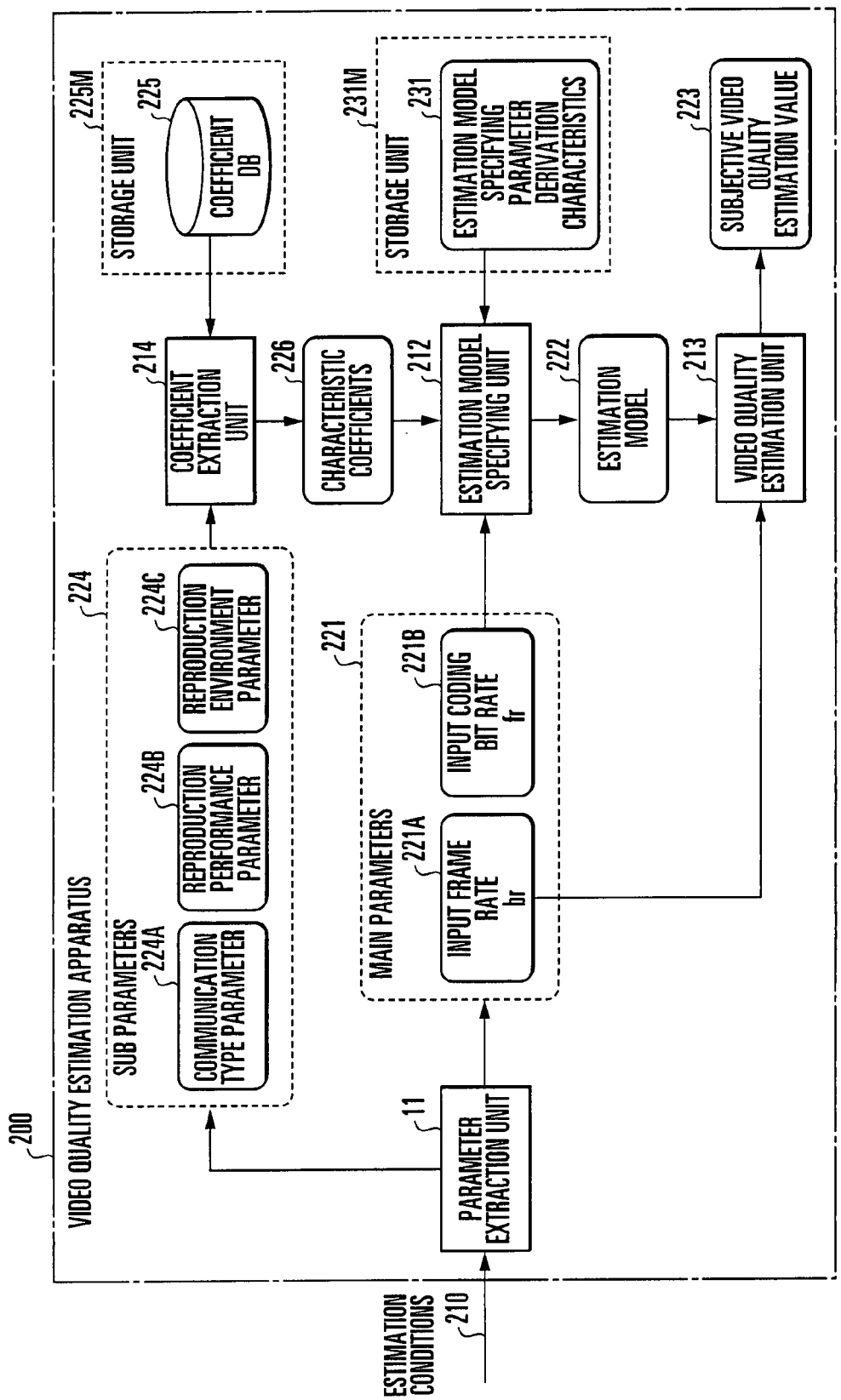
FIG. 29 is a block diagram showing the arrangement of a video quality estimation apparatus according to the fourth embodiment of the present invention.
Figure 30:
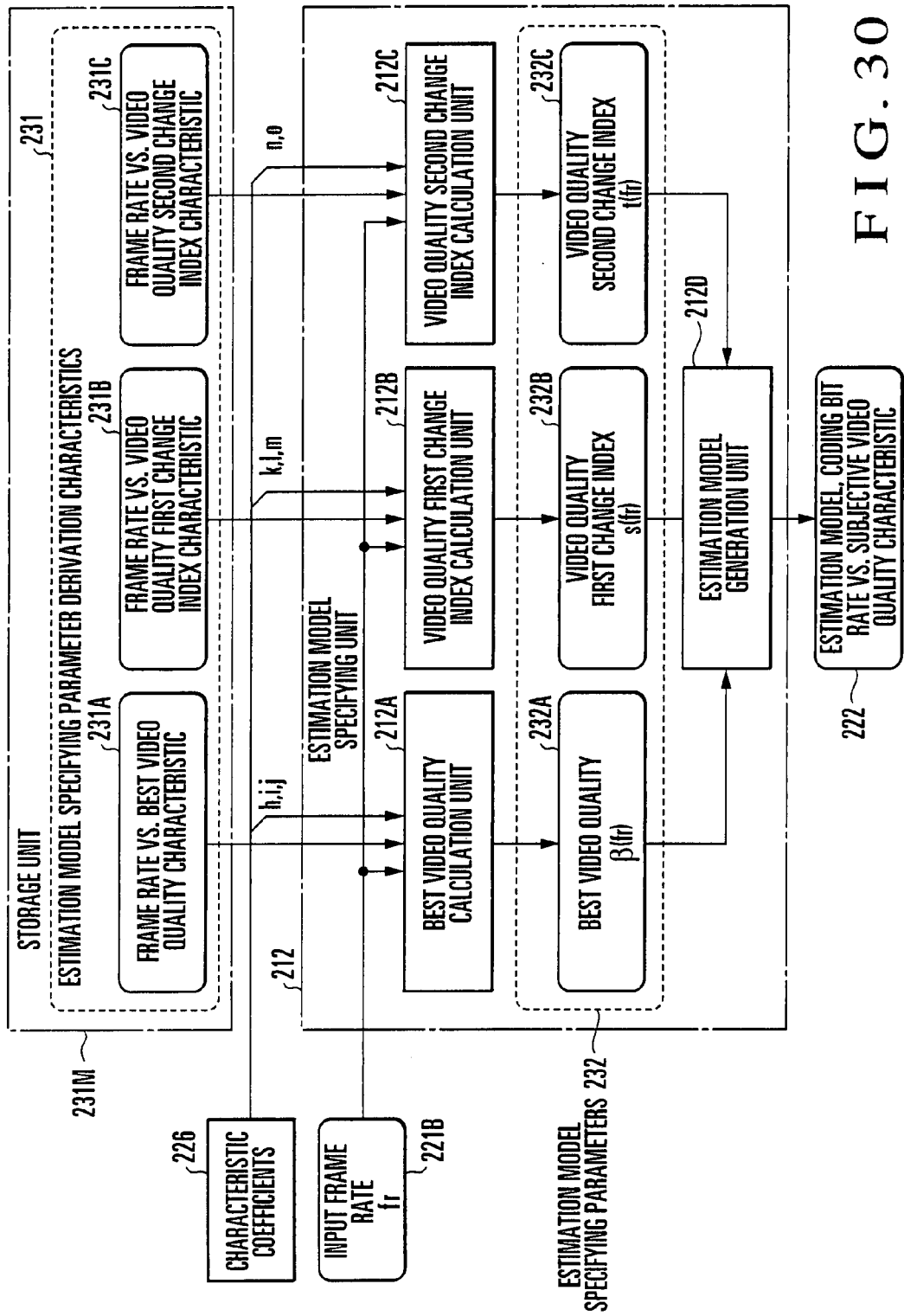
FIG. 30 is a block diagram showing the arrangement of the estimation model specifying unit of the video quality estimation apparatus according to the fourth embodiment of the present invention.

A video quality estimation apparatus according to the fourth embodiment of the present invention will be described next with reference to FIGS. 29 and 30. FIG. 29 is a block diagram showing the arrangement of a video quality estimation apparatus according to the fourth embodiment of the present invention. The same reference numerals as in FIG. 19 described above denote the same or similar parts in FIG. 29. FIG. 30 is a block diagram showing the arrangement of the estimation model specifying unit of the video quality estimation apparatus according to the fourth embodiment of the present invention. The same reference numerals as in FIG. 20 described above denote the same or similar parts in FIG. 30.

The third embodiment has exemplified a case in which the estimation model specifying parameters 232 corresponding to an input frame rate are derived by referring to the estimation model specifying parameter derivation characteristics 231 prepared in advance. In the fourth embodiment, a case will be described in which estimation model specifying parameter derivation characteristics 231 corresponding to various estimation conditions 210 related to an evaluation target audiovisual communication service are sequentially specified on the basis of, of the estimation conditions 210, the communication type of the audiovisual communication service, the reproduction performance of a terminal that reproduces an audiovisual medium, or the reproduction environment of a terminal that reproduces an audiovisual medium.

Unlike the third embodiment (FIG. 19), a video quality estimation apparatus 200 according to the fourth embodiment additionally includes a coefficient extraction unit 214 and a coefficient database (to be referred to as a coefficient DB hereinafter) 225.

The coefficient extraction unit 214 has a function of extracting characteristic coefficients 226 corresponding to sub parameters 224 extracted by a parameter extraction unit 211 from the estimation conditions 210 by referring to the coefficient DB 225 in a storage unit 225M (fourth storage unit).

FIG. 31 is an explanatory view showing an arrangement of the coefficient DB. The coefficient DB 225 is a database showing sets of the various sub parameters 224 and corresponding characteristic coefficients a', b', c', ..., h' (226). The sub parameters 224 include a communication type parameter 224A indicating the communication type of an audiovisual communication service, a reproduction performance parameter 224B indicating the reproduction performance of a terminal that reproduces an audiovisual medium, and a reproduction environment parameter 224C indicating the reproduction environment of a terminal that reproduces an audiovisual medium.

A detailed example of the communication type parameter 224A is "task" that indicates a communication type executed by an evaluation target audiovisual communication service.

Detailed examples of the reproduction performance parameter 224B are "encoding method", "video format", and "key frame" related to encoding of an audiovisual medium and "monitor size" and "monitor resolution" related to the medium reproduction performance of a terminal.

A detailed example of the reproduction environment parameter 224C is "indoor luminance" in reproducing a medium on a terminal.

The sub parameters 224 are not limited to these examples. They can arbitrarily be selected in accordance with the contents of the evaluation target audiovisual communication service or audiovisual medium and need only include at least one of the communication type parameter 224A, reproduction performance parameter 224B, and reproduction environment parameter 224C.

The coefficient extraction unit 214 extracts the characteristic coefficients 226 corresponding to the sub parameters 224 by referring to the coefficient DB 225 in the storage unit 225M prepared in advance. The characteristic coefficients 226 are coefficients to specify the estimation model specifying parameter derivation characteristics to be used to derive estimation model specifying parameters 232.

An estimation model specifying unit 212 specifies the estimation model specifying parameter derivation characteristics 231, i.e., frame rate vs. best video quality characteristic 231A, frame rate vs. video quality first change index characteristic 231B, and frame rate vs. video quality second change index characteristic 231C specified by the characteristic coefficients 226 extracted by the coefficient extraction unit 214.

[Estimation Model Specifying Parameter Derivation Characteristics]

The estimation model specifying parameter derivation characteristics 231 used by the estimation model specifying unit 212 will be described next in detail.

The estimation model specifying parameter derivation characteristics 231 can be modeled in the following way by using the characteristic coefficients 226 extracted by the coefficient extraction unit 214 from the coefficient DB 225.

The frame rate vs. best video quality characteristic 231A of the estimation model specifying parameter derivation characteristics 231 tends to monotonically increase the best video quality along with the increase in frame rate and then converge to certain maximum subjective video quality, as shown in FIG. 24 described above. The frame rate vs. best video quality characteristic 231A can be modeled by, e.g., a general exponential function. Let fr be the frame rate, $\beta(fr)$ be the corresponding best video quality, and a', b', and c' be coefficients. In this case, the frame rate vs. best video quality characteristic 231A is given by $$\beta(fr)=a'+b'\cdot \exp(-fr/c') \qquad (10)$$

The frame rate vs. video quality first change index characteristic 231B of the estimation model specifying parameter derivation characteristics 231 tends to monotonically increase the video quality first change index along with the increase in frame rate, as shown in FIG. 25 described above. The frame rate vs. video quality first change index characteristic 231B can be modeled by, e.g., a general exponential function. Let fr be the frame rate, s(fr) be the corresponding video quality first change index, and d', e', and f' be coefficients. In this case, the frame rate vs. video quality first change index characteristic 231B is given by $$s(fr)=d'+e'\cdot \exp(fr/f') \qquad (11)$$

The frame rate vs. video quality second change index characteristic 231C of the estimation model specifying parameter derivation characteristics 231 tends to monotonically decrease the video quality second change index along with the increase in frame rate, as shown in FIG. 26 described above. The frame rate vs. video quality second change index characteristic 231C can be modeled by, e.g., a general linear function. Let fr be the frame rate, t(fr) be the corresponding video quality second change index, and g' and h' be coefficients. In this case, the frame rate vs. video quality second change index characteristic 231C is given by $$t(fr)=g'+h'\cdot fr \qquad (12)$$

Modeling of the estimation model specifying parameter derivation characteristics 231 need not always be done by using the above-described exponential function or linear function. Any other function may be used. For example, depending on the contents of the evaluation target audiovisual communication service or audiovisual medium, the network performance, or the contents of the estimation conditions 210, a video quality estimation process based on an input coding bit rate or input frame rate within a relatively limited range suffices. If such local estimation is possible, the frame rate vs. best video quality characteristic 231A or frame rate vs. video quality first change index characteristic 231B can be modeled by a simple function such as a linear function, as described above.

If the estimation model specifying parameters largely change with respect to the input coding bit rate or input frame rate, the frame rate vs. video quality second change index characteristic 231C and the frame rate vs. best video quality characteristic 231A or frame rate vs. video quality first change index characteristic 231B may be modeled by using another function such as an exponential function or logistic function.

[Operation of the Fourth Embodiment]

Figure 32:
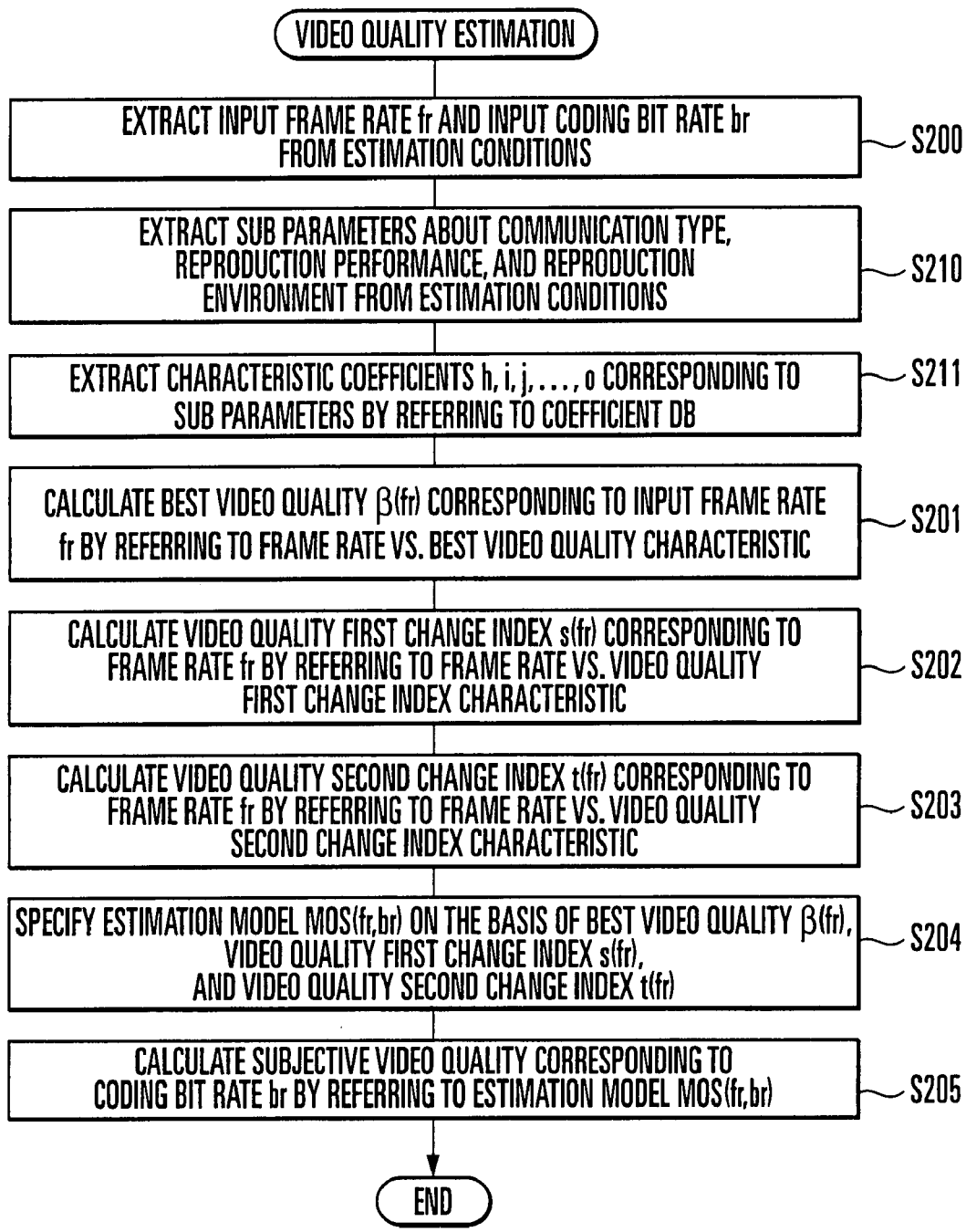
FIG. 32 is a flowchart illustrating the video quality estimation process of the video quality estimation apparatus according to the fourth embodiment of the present invention.

The operation of the video quality estimation apparatus according to the fourth embodiment of the present invention will be described next with reference to FIG. 32. FIG. 32 is a flowchart illustrating the video quality estimation process of the video quality estimation apparatus according to the fourth embodiment of the present invention. The same step numbers as in FIG. 27 described above denote the same or similar steps in FIG. 32.

The video quality estimation apparatus 200 starts the video quality estimation process in FIG. 32 in accordance with an instruction operation from the operator or input of the estimation conditions 210. The communication type parameter 224A, reproduction performance parameter 224B, and reproduction environment parameter 224C are used as the sub parameters 224. The coefficient DB 225 in the storage unit 225M stores the sets of the sub parameters 224 and characteristic coefficients 226 in advance.

First, the parameter extraction unit 211 extracts the various estimation conditions 210 related to an evaluation target audiovisual communication service, extracts a coding bit rate and a frame rate related to encoding of an audiovisual medium from the estimation conditions 210, and outputs an input coding bit rate br (221A) and an input frame rate fr (221B) as main parameters 221 (step S200). The parameter extraction unit 211 also extracts the communication type parameter 224A, reproduction performance parameter 224B, and reproduction environment parameter 224C from the estimation conditions 210 and outputs them as the sub parameters 224 (step S210).

The coefficient extraction unit 214 extracts and outputs the characteristic coefficients a', b', c', . . . , h' corresponding to the values of the sub parameters 224 by referring to the coefficient DB 225 in the storage unit 225M (step S211).

Accordingly, the estimation model specifying unit 212 causes the best video quality calculation unit 212A to calculate best video quality β(fr) (232A) corresponding to the input frame rate fr (221B) by referring to the frame rate vs. best video quality characteristic 231A which is specified by the characteristic coefficients a', b', and c' of the characteristic coefficients 226 (step S201).

Next, the estimation model specifying unit 212 causes the video quality first change index calculation unit 212B to calculate a video quality first change index s(fr) (232B) corresponding to the input frame rate fr (221B) by referring to the frame rate vs. video quality first change index characteristic 231B which is specified by the characteristic coefficients d', e', and f' of the characteristic coefficients 226 (step S202).

Similarly, the estimation model specifying unit 212 causes the video quality second change index calculation unit 212C to calculate a video quality second change index t(fr) (232C) corresponding to the input frame rate fr (221B) by referring to the frame rate vs. video quality second change index characteristic 231C which is specified by the characteristic coefficients g' and h' of the characteristic coefficients 226 (step S203).

After the estimation model specifying parameters 232 are calculated, the estimation model specifying unit 212 causes an estimation model generation unit 212D to substitute the actual values of the estimation model specifying parameters 232 including the best video quality β(fr), video quality first change index s(fr), and video quality second change index t(fr) into equation (9) described above, thereby specifying an estimation model 222, i.e., coding bit rate vs. subjective video quality characteristic (step S204).

Then, the video quality estimation apparatus 200 causes a video quality estimation unit 213 to calculate video quality corresponding to the input coding bit rate 221A of the main parameters 221 output from the parameter extraction unit 211 by referring to the estimation model 222 specified by the estimation model specifying unit 212, outputs the video quality as a subjective video quality estimation value 223 of subjective video quality a viewer actually senses from the audiovisual medium reproduced on the terminal by using the evaluation target audiovisual communication service (step S205), and finishes the series of video quality estimation processes.

As described above, in this embodiment, the coefficient extraction unit 214 extracts, from the coefficient DB 225 in the storage unit 225M, the characteristic coefficients 226 corresponding to the sub parameters 224 which are extracted by the parameter extraction unit 211 and include at least one of the communication type parameter 224A, reproduction performance parameter 224B, and reproduction environment parameter 224C. The estimation model specifying unit 212 calculates the estimation model specifying parameters 232 corresponding to the input frame rate 221B on the basis of the estimation model specifying parameter derivation characteristics 231 specified by the characteristic coefficients 226. It is therefore possible to derive the estimation model specifying parameters 232 based on the specific properties of the evaluation target audiovisual communication service or terminal. This improves the video quality estimation accuracy.

Especially, in estimating video quality in the prior art, a video quality estimation model needs to be prepared for each encoding method or terminal used in an evaluation target audiovisual communication service. However, according to this embodiment, the video quality estimation model does not depend on the encoding method or terminal. The same video quality estimation model can be used only by referring to the coefficients to be used in the video quality estimation model in accordance with the encoding method or terminal. It is therefore possible to flexibly cope with audiovisual communication services in different environments.

Figure 33:
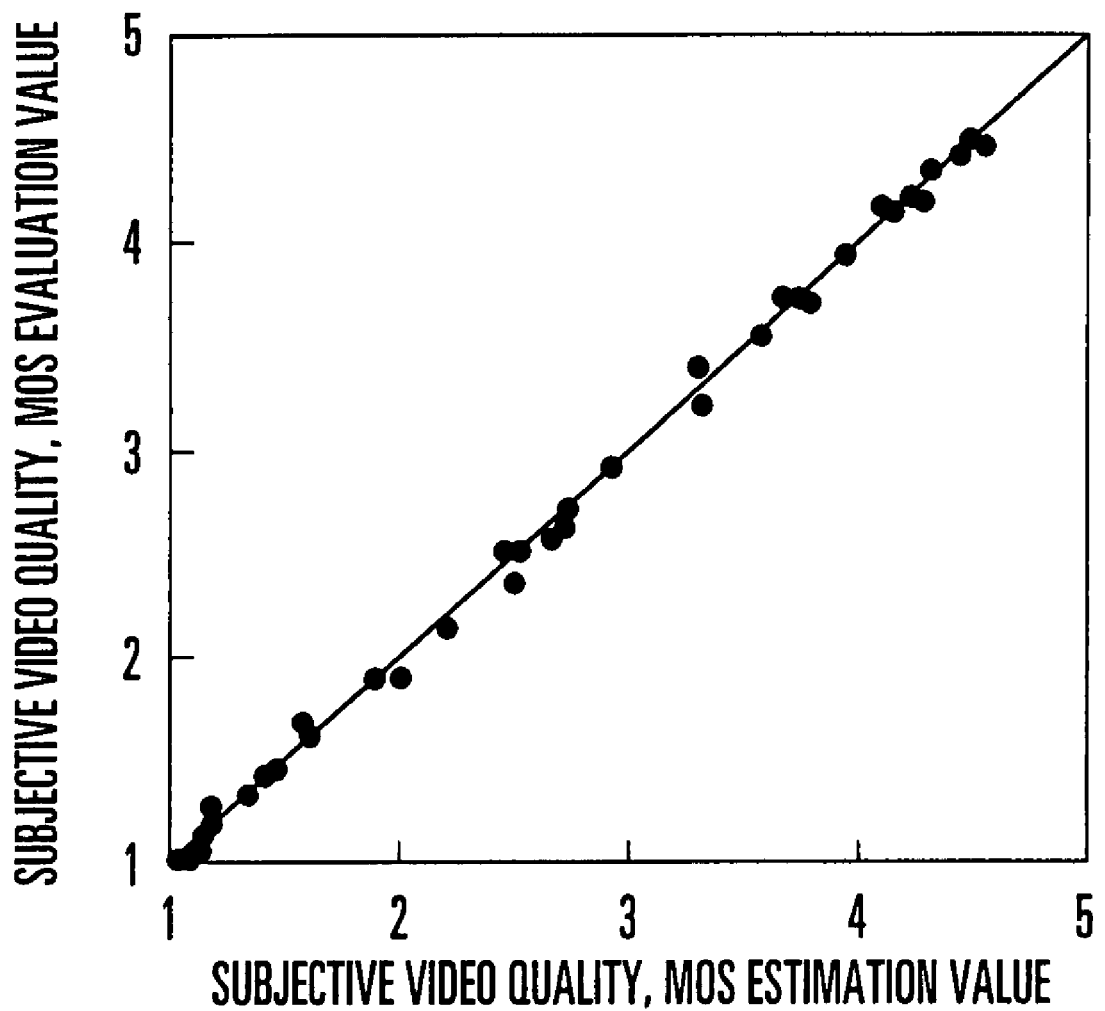
FIG. 33 is a graph showing the estimation accuracy of a video quality estimation apparatus using the embodiment.

FIG. 33 is a graph showing the estimation accuracy of a video quality estimation apparatus using this embodiment. Referring to FIG. 33, the abscissa represents the estimation value (MOS value) of subjective video quality estimated by using the video quality estimation apparatus, and the ordinate represents the evaluation value (MOS value) of subjective video quality actually opinion-evaluated by a viewer. The error between the evaluation value and the estimation value is smaller, and the estimation accuracy is higher in FIG. 33 than in FIG. 18 that shows the estimation accuracy of the conventional video quality estimation apparatus based on reference 2 described above. These are comparison results under specific estimation conditions. Similar comparison results have been confirmed even when another encoding method or terminal was used.

[Extension of Embodiments]

In the above-described first and second embodiments, the estimation model 122 is modeled using a Gaussian function. However, the present invention is not limited to this. Any other function such as a quadratic function or higher-order function is also usable. In the above-described example, the estimation model 122 is modeled by a function. Any model other than a function, e.g., a black box model such as a neural network or case-based reasoning that specifies only the input/output characteristic may be used.

As for the correlation between the sub parameters and the characteristic coefficients 126 in the coefficient DB 125 used in the second embodiment, the characteristic coefficients 126 may be calculated by actually measuring the estimation model specifying parameter derivation characteristics 131 for each combination of various sub parameters and executing a convergence operation by the least squares method for the obtained measurement data. The video quality estimation apparatus 100 may include an arrangement for such characteristic coefficient calculation.

In the above-described third and fourth embodiments, the estimation model 222 is modeled using a logistic function. However, the present invention is not limited to this. Any other function such as a quadratic function or higher-order function is also usable. In the above-described example, the estimation model 222 is modeled by a function. Any model other than a function, e.g., a black box model such as a neural network or case-based reasoning that specifies only the input/output characteristic may be used.

As for the correlation between the sub parameters and the characteristic coefficients 226 in the coefficient DB 225 used in the fourth embodiment, the characteristic coefficients 226 may be calculated by actually measuring the estimation model specifying parameter derivation characteristics 231 for each combination of various sub parameters and executing a convergence operation by the least squares method for the obtained measurement data. The video quality estimation apparatus 200 may include an arrangement for such characteristic coefficient calculation.

In the embodiments, storage units such as the storage units 131M, 125M, 231M, and 225M are formed by separate storage devices. However, the present invention is not limited to this. Some or all of the storage units may be formed by a single storage device.

The invention claimed is:

1. A video quality estimation a apparatus comprising:
parameter extraction unit extracts, as main parameters including an input coding bit rate and an input frame rate, respectively, audiovisual medium parameters including a coding bit rate representing the number of coding bits per unit time and a frame rate representing the number of frames per unit time of an audiovisual medium encoded into plurality of frames;
an estimation model specifying unit which specifies, on the basis of the main parameter corresponding to one parameter of the audiovisual medium parameter, an estimation model representing a relationship between subjective video quality and the other parameter of the audiovisual medium parameters;
a video quality estimation unit which estimates subjective video quality corresponding to the main parameter corresponding to said one parameter by using the specified estimation model and outputs the subjective video quality as an estimation value of subjective video quality a viewer actually senses from the audiovisual medium received via a communication network and reproduced on an arbitrary terminal;
wherein the main parameter corresponding to said one parameter includes the input coding bit rate, and said other parameter includes the frame rate; and
wherein-said estimation model specifying unit comprises an optimum frame rate calculation unit which calculates an optimum frame rate representing a frame rate corresponding to best subjective video quality of the audiovisual medium transmitted at the input coding bit rate, a best video quality calculation unit which calculates best video quality corresponding to a best value of the subjective video quality of the audiovisual medium transmitted at the input coding bit rate, and an estimation model generation unit which generates the estimation model on the basis of estimation model specifying parameter including the optimum frame rate and the best video quality.

2. A video quality estimation apparatus according to claim 1, wherein wherein
said estimation model specifying unit further comprises a video quality degradation index calculation unit which calculates a video quality degradation index representing a degree of degradation from the best video quality of the audiovisual medium transmitted at the input coding bit rate, and
said estimation model generation unit generates the estimation model on the basis of estimation model specifying parameter including the optimum frame rate, the best video quality, and the video quality degradation index.

3. A video quality estimation apparatus according to claim 1, wherein wherein the estimation model is formed from a frame rate vs. video quality characteristic which exhibits a convex shape having, as a vertex, the best video quality at the optimum frame rate when the coding bit rate of the audiovisual medium constantly keeps the input coding bit rate.

4. A video quality estimation apparatus according to claim 3, wherein the estimation model is formed from a Gaussian function which exhibits a convex shape having, as a vertex, the best video quality at the optimum frame rate.

5. A video quality estimation apparatus according to claim 1, wherein said optimum frame rate calculation unit calculates the optimum frame rate corresponding to the input coding bit rate on the basis of a coding bit rate vs. optimum frame rate characteristic which monotonically increases the optimum frame rate along with an increase in coding bit rate and then converges to a predetermined maximum frame rate.

6. A video quality estimation apparatus according to claim 1, wherein said best video quality calculation unit calculates the best video quality corresponding to the input coding bit rate on the basis of a coding bit rate vs. best video quality characteristic which monotonically increases the best video quality along with an increase in coding bit rate and then converges to a predetermined maximum subjective video quality value.

7. A video quality estimation apparatus according to claim 2, wherein said video quality degradation index calculation unit calculates the video quality degradation index corresponding to the input coding bit rate on the basis of a coding bit rate vs. video quality degradation index characteristic which monotonically increases the video quality degradation index along with an increase in coding bit rate.

8. A video quality estimation apparatus according to claim 1, further comprising a first storage unit which stores a coding bit rate vs. optimum frame rate characteristic representing a relationship between the coding bit rate of the audiovisual medium and the optimum frame rate representing the frame rate corresponding to the best subjective video quality of the audiovisual medium transmitted at the coding bit rate, and a coding bit rate vs. best video quality characteristic representing a relationship between the coding bit rate of the audiovisual medium and the best video quality corresponding to the best value of the subjective video quality of the audiovisual medium transmitted at the coding bit rate,
wherein said optimum frame rate calculation unit calculates the optimum frame rate corresponding to the input coding bit rate by referring to the coding bit rate vs. optimum frame rate characteristic, and said best video quality calculation unit calculates the best video quality corresponding to the input coding bit rate by referring to the coding bit rate vs. best video quality characteristic.

9. A video quality estimation apparatus according to claim 8, wherein
said first storage unit further stores a coding bit rate vs. video quality degradation index characteristic representing a relationship between the coding bit rate of the audiovisual medium and the degree of degradation from the best video quality of the audiovisual medium transmitted at the coding bit rate, and
said video quality degradation index calculation unit calculates the video quality degradation index corresponding to the input coding bit rate by referring to the coding bit rate vs. video quality degradation index characteristic.

10. A video quality estimation apparatus according to claim 1, further comprising:
a second storage unit which stores a correlation between characteristic coefficients to be used to derive estimation model specifying parameters and sub parameters including at least one of a communication type parameter indicating a type of audiovisual communication, a reproduction performance parameter indicating reproduction performance of the audiovisual medium on the terminal, and a reproduction environment parameter indicating an ambient environment in reproducing the audiovisual medium on the terminal; and
a coefficient extraction unit which extracts characteristic coefficients corresponding to sub parameters extracted by said parameter extraction unit by referring to said second storage unit,
wherein said estimation model specifying unit calculates the estimation model specifying parameters corresponding to the input coding bit rate on the basis of estimation model specifying parameter derivation characteristics specified by the characteristic coefficients and representing a relationship between the coding bit rate and arbitrary estimation model specifying parameters.

11. A video quality estimation apparatus comprising:
a parameter extraction unit which extracts, as main parameter including, an input coding bit rate and an input frame rate, respectively, audiovisual medium parameters including a coding bit rate representing the number of coding bits per unit time and a frame rate representing the number of frames per unit time of an audiovisual medium encoded into a plurality of frames;
an estimation mode specifying unit which specifies, on the basis of the main parameter corresponding to one parameter of the audiovisual medium parameters, a estimation model representing, a relationship between subjective video quality and the other parameter of the audiovisual medium parameters; and
a video estimation unit which estimates subjective video quality corresponding to the main parameter corresponding to said one parameter by using the specified estimation model and outputs the subjective video quality as an estimation value of subjective video quality a viewer actually senses from the audiovisual medium received via a communication network and reproduced on an arbitrary terminal,
wherein the main parameter corresponding to said one parameter includes the input frame rate, and said other parameter includes the coding bit rate, and
said estimation model specifying unit comprises a best video quality calculation unit which calculates best video quality corresponding to a best value of the subjective video quality of the audiovisual medium transmitted at the input frame rate, a video quality first change index calculation unit which calculates a video quality first change index representing a degree of change of the subjective video quality of the audiovisual medium transmitted at the input frame rate, a video quality second change index calculation unit which calculates a video quality second change index representing a degree of change of the subjective video quality of the audiovisual medium transmitted at the input frame rate, and an estimation model generation unit which generates the estimation model on the basis of estimation model specifying parameters including the best video quality, the video quality first change index, and the video quality second change index.

12. A video quality estimation apparatus according to claim 11, wherein the estimation model is formed from a coding bit rate vs. video quality characteristic which monotonically increases the subjective video quality along with an increase in coding bit rate of the audiovisual medium at a degree of change based on the video quality first change index and the video quality second change index and converges to the best video quality when the frame rate of the audiovisual medium constantly keeps the input frame rate.

13. A video quality estimation apparatus according to claim 12, wherein the estimation model is formed from a logistic function which monotonically increases along with an increase in coding bit rate of the audiovisual medium and converges to the best video quality.

14. A video quality estimation apparatus according to claim 11, wherein said best video quality calculation unit calculates the best video quality corresponding to the input frame rate on the basis of a frame rate vs. best video quality characteristic which monotonically increases the best video quality along with an increase in frame rate and then converges to a predetermined maximum value.

15. A video quality estimation apparatus according to claim 11, wherein said video quality first change index calculation unit calculates the video quality first change index corresponding to the input frame rate on the basis of a frame rate vs. video quality first change index characteristic which monotonically increases the video quality first change index along with an increase in frame rate.

16. A video quality estimation apparatus according to claim 11, wherein said video quality second change index calculation unit calculates the video quality second change index corresponding to the input frame rate on the basis of a frame rate vs. video quality second change index characteristic which monotonically decreases the video quality second change index along with an increase in frame rate.

17. A video quality estimation apparatus according to claim 11, further comprising a third storage unit which stores a frame rate vs. best video quality characteristic representing a relationship between the frame rate of the audiovisual medium and the best video quality corresponding to the best value of the subjective video quality of the audiovisual medium transmitted at the frame rate, a frame rate vs. video quality first change index characteristic representing a relationship between the frame rate of the audiovisual medium and the video quality first change index representing the degree of change of the subjective video quality of the audiovisual medium transmitted at the frame rate, and a frame rate vs. video quality second change index characteristic representing a relationship between the frame rate of the audiovisual medium and the video quality second change index representing the degree of change of the subjective video quality of the audiovisual medium transmitted at the frame rate,
wherein said best video quality calculation unit calculates the best video quality corresponding to the input frame rate by referring to the frame rate vs. best video quality characteristic, said video quality first change index calculation unit calculates the video quality first change index corresponding to the input frame rate by referring to the frame rate vs. video quality first change index characteristic, and said video quality second change index calculation unit calculates the video quality second change index corresponding to the input frame rate by referring to the frame rate vs. video quality second change index characteristic.

18. A video quality estimation apparatus according to claim 11, further comprising:
a fourth storage unit which stores a correlation between characteristic coefficients to be used to derive estimation model specifying parameters and sub parameters including at least one of a communication type parameter indicating a type of audiovisual communication, a reproduction performance parameter indicating reproduction performance of the audiovisual medium on the terminal, and a reproduction environment parameter indicating an ambient environment in reproducing the audiovisual medium on the terminal; and
a coefficient extraction unit which extracts characteristic coefficients corresponding to sub parameters extracted by said parameter extraction unit by referring to said fourth storage unit,
wherein said estimation model specifying unit calculates the estimation model specifying parameters corresponding to the input coding bit rate on the basis of estimation model specifying parameter derivation characteristics specified by the characteristic coefficients and representing a relationship between the coding bit rate and arbitrary estimation model specifying parameters.

19. A video quality estimation method comprising:
a parameter extraction step causing parameter extraction unit to extract, as main parameters including an input coding bit rate and an input frame rate, respectively, audiovisual medium parameters including coding , bit rate representing the number of coding bits per unit time and a frame rate representing the number of frames per unit of an audiovisual medium encoded into a plurality of frames:
an estimation model specifying step causing estimation model s specifying unit to specify, on the basis of the main parameter corresponding to one parameter of the audiovisual medium parameters, estimation model representing a relationship between subjective video quality and said other parameter of the audiovisual medium parameters; and
a video quality estimation step causing a video quality estimation unit to estimate subjective video quality corresponding to the main parameter corresponding to said one parameter by using the specified estimation model and output the subjective video quality as an estimation value of subjective video quality a viewer actually senses from the audiovisual medium received via a communication network and reproduced on an arbitrary terminal,
wherein the main parameter corresponding to said one parameter includes the input coding bit rate, and said other parameter includes the input frame rate,
wherein the estimation model specifying step comprises an optimum frame rate calculation step calculating an optimum frame rate representing a frame rate corresponding to best subjective video quality of the audiovisual medium transmitted at the input coding bit rate, a best video quality calculation step calculating best video quality corresponding to a best value of the subjective video quality of the audiovisual medium transmitted at the input coding bit rate, and an estimation model generation step generating the estimation model on the basis of estimation model specifying parameters including the optimum frame rate and the best video quality.

20. A video quality estimation method according to claim 19, wherein
the estimation model specifying step further comprises the video quality degradation index calculation step of calculating a video quality degradation index representing a degree of degradation from the best video quality of the audiovisual medium transmitted at the input coding bit rate, and
in the estimation model genera on step, the estimation model is generated on the basis of estimation model specifying parameters including the optimum frame rate, the best video quality, and the video quality degradation index.

21. A video quality estimation method according to claim 19, wherein the estimation model is formed from a frame rate vs. video quality characteristic which exhibits a convex shape having, as a vertex, the best video quality at the optimum frame rate when the coding bit rate of the audiovisual medium constantly keeps the input coding bit rate.

22. A video quality estimation method according to claim 21, wherein the estimation model is formed from a Gaussian function which exhibits a convex shape having, as a vertex, the best video quality at the optimum frame rate.

23. A video quality estimation method according to claim 19, wherein in the optimum frame rate calculation step, the optimum frame rate corresponding to the input coding bit rate is calculated on the basis of a coding bit rate vs. optimum frame rate characteristic which monotonically increases the optimum frame rate along with an increase in coding bit rate and then converges to a predetermined maximum frame rate.

24. A video quality estimation method according to claim 19, wherein in the best video quality calculation step, the best video quality corresponding to the input coding bit rate is calculated on the basis of a coding bit rate vs. best video quality characteristic which monotonically increases the best video quality along with an increase in coding bit rate and then converges to a predetermined maximum subjective video quality value.

25. A video quality estimation method according to claim 20, wherein in the video quality degradation index calculation step, the video quality degradation index corresponding to the input coding bit rate is calculated on the basis of a coding bit rate vs. video quality degradation index characteristic which monotonically increases the video quality degradation index along with an increase in coding bit rate.

26. A video quality estimation method according to claim 19, further comprising the first storage step of causing a first storage unit to store a coding bit rate vs. optimum frame rate characteristic representing a relationship between the coding bit rate of the audiovisual medium and the optimum frame rate representing the frame rate corresponding to the best subjective video quality of the audiovisual medium transmitted at the coding bit rate, and a coding bit rate vs. best video quality characteristic representing a relationship between the coding bit rate of the audiovisual medium and the best video quality corresponding to the best value of the subjective video quality of the audiovisual medium transmitted at the coding bit rate,
wherein in the optimum frame rate calculation step, the optimum frame rate corresponding to the input coding bit rate is calculated by referring to the coding bit rate vs. optimum frame rate characteristic, and in the best video quality calculation step, the best video quality corresponding to the input coding bit rate is calculated by referring to the coding bit rate vs. best video quality characteristic.

27. A video quality estimation method according to claim 26, wherein
in the first storage step, the first storage unit further stores a coding bit rate vs. video quality degradation index characteristic representing a relationship between the coding bit rate of the audiovisual medium and the degree of degradation from the best video quality of the audiovisual medium transmitted at the coding bit rate, and
in the video quality degradation index calculation step, the video quality degradation index corresponding to the input coding bit rate is calculated by referring to the coding bit rate vs. video quality degradation index characteristic.

28. A video quality estimation method according to claim 19, further comprising:
a second storage step causing a second storage unit to store a correlation between characteristic coefficients to be used to derive estimation model specifying parameters and sub parameters including at least one of a communication type parameter indicating a type of audiovisual communication, a reproduction performance parameter indicating reproduction performance of the audiovisual medium on the terminal, and a reproduction environment parameter indicating an ambient environment in reproducing the audiovisual medium on the terminal; and
a second parameter extraction step causing a coefficient extraction unit to extract characteristic coefficients corresponding to sub parameters extracted in the parameter extraction step by referring to the second storage unit,
wherein in the estimation model specifying step, the estimation model specifying parameters corresponding to the input coding bit rate are calculated on the basis of estimation model specifying parameter derivation characteristics specified by the characteristic coefficients and representing a relationship between the coding bit rate and arbitrary estimation model specifying parameters.

29. A video quality estimation method comprising:
the parameter extraction step of causing a parameter extraction unit to extract, as main parameter including an input coding bit rate and an input frame rate, respective, audiovisual medium parameter including a coding bit rate representing the number of coding bits per unit time and a frame rate representing the number of frames per unit time of an audiovisual medium encoded into a rarity of frames;
the estimation model specifying step of causing an estimation model specifying unit to specify, on the basis of the main parameter corresponding o one he audiovisual medium parameters, an estimation el representing a relationship between subjective video quality and said other parameter of the audiovisual medium parameters; and
the video quality estimation step of causing a video quality estimation unit to estimate subjective video quality corresponding to the main parameter corresponding to said one parameter by using the specified estimation model and output the subjective video quality of an estimation value of subjective video quality a viewer actually senses from the audiovisual medium received via a communication network and reproduced on an arbitrary terminal,
wherein the main parameter corresponding to said one parameter includes the input frame rate, and said other parameter includes the coding bit rate, and
the estimation model specifying step comprises the best video quality calculation step of calculating best video quality corresponding to a best value of the subjective video quality of the audiovisual medium transmitted at the input frame rate, the video quality first change index calculation step of calculating a video quality first change index representing a degree of change of the subjective video quality of the audiovisual medium transmitted at the input frame rate, the video quality second change index calculation step of calculating a video quality second change index representing a degree of change of the subjective video quality of the audiovisual medium transmitted at the input frame rate, and the estimation model generation step of generating the estimation model on the basis of estimation model specifying parameters including the best video quality, the video quality first change index, and the video quality second change index.

30. A video quality estimation method according to claim 29, wherein the estimation model is formed from a coding bit rate vs. video quality characteristic which monotonically increases the subjective video quality along with an increase in coding bit rate of the audiovisual medium at a degree of change based on the video quality first change index and the video quality second change index and converges to the best video quality when the frame rate of the audiovisual medium constantly keeps the input frame rate.

31. A video quality estimation method according to claim 30, wherein the estimation model uses a logistic function which monotonically increases along with an increase in coding bit rate of the audiovisual medium and converges to the best video quality.

32. A video quality estimation method according to claim 29, wherein in the best video quality calculation step, the best video quality corresponding to the input frame rate is calculated on the basis of a frame rate vs. best video quality characteristic which monotonically increases the best video quality along with an increase in frame rate and then converges to a predetermined maximum value.

33. A video quality estimation method according to claim 29, wherein in the video quality first change index calculation step, the video quality first change index corresponding to the input frame rate is calculated on the basis of a frame rate vs. video quality first change index characteristic which monotonically increases the video quality first change index along with an increase in frame rate.

34. A video quality estimation method according to claim 29, wherein in the video quality second change index calculation step, the video quality second change index corresponding to the input frame rate is calculated on the basis of a frame rate vs. video quality second change index characteristic which monotonically decreases the video quality second change index along with an increase in frame rate.

35. A video quality estimation method according to claim 29, further comprising the third storage step of causing a third storage unit to store a frame rate vs. best video quality characteristic representing a relationship between the frame rate of the audiovisual medium and the best video quality corresponding to the best value of the subjective video quality of the audiovisual medium transmitted at the frame rate, a frame rate vs. video quality first change index characteristic representing a relationship between the frame rate of the audiovisual medium and the video quality first change index representing the degree of change of the subjective video quality of the audiovisual medium transmitted at the frame rate, and a frame rate vs. video quality second change index characteristic representing a relationship between the frame rate of the audiovisual medium and the video quality second change index representing the degree of change of the subjective video quality of the audiovisual medium transmitted at the frame rate, wherein in the best video quality calculation step, the best video quality corresponding to the input frame rate is calculated by referring to the frame rate vs. best video quality characteristic, in the video quality first change index calculation step, the video quality first change index corresponding to the input frame rate is calculated by referring to the frame rate vs. video quality first change index characteristic, and in the video quality second change index calculation step, the video quality second change index corresponding to the input frame rate is calculated by referring to the frame rate vs. video quality second change index characteristic.

36. A video quality estimation method according to claim 29, further comprising:

the fourth storage step of causing a fourth storage unit to store a correlation between characteristic coefficients to be used to derive estimation model specifying parameters and sub parameters including at least one of a communication type parameter indicating a type of audiovisual communication, a reproduction performance parameter indicating reproduction performance of the audiovisual medium on the terminal, and a reproduction environment parameter indicating an ambient environment in reproducing the audiovisual medium on the terminal; and the parameter extraction step of causing a coefficient extraction unit to extract characteristic coefficients corresponding to sub parameters extracted in the parameter extraction step by referring to the fourth storage unit, wherein in the estimation model specifying step, the estimation model specifying parameters corresponding to the input coding bit rate are calculated on the basis of estimation model specifying parameter derivation characteristics specified by the characteristic coefficients and representing a relationship between the coding bit rate and arbitrary estimation model specifying parameters.

37. A recording medium having a computer program recorded thereon, which program, when executed by a computer comprises:

a video quality estimator calculating for audiovisual communication to transmit an audiovisual medium encoded into a plurality of frames to an arbitrary terminal via a communication network, an estimation value of subjective video quality a viewer actually senses from the audiovisual medium reproduced on the terminal by using a predetermined estimation model, a parameter extraction step of causing a parameter extraction unit to extract, as main parameters including an input coding bit rate and an input frame rate, respectively, audiovisual medium parameters including a coding bit rate representing the number of coding bits per unit time and a frame rate representing the number of frames per unit time of the audiovisual medium;

an estimation model specifying step causing an estimation model specifying unit to specify, on the basis of the main parameter corresponding to one parameter of the audiovisual medium parameters, an estimation model representing a relationship between subjective video quality and said other parameter of the audiovisual medium parameters;

a video quality estimation step causing a video quality estimation unit to estimate subjective video quality corresponding to the main parameter corresponding to said one parameter by using the specified estimation model and output the subjective video quality as an estimation value of subjective video quality a viewer actually senses from the audiovisual medium received via a communication network and reproduced on an arbitrary terminal;

wherein the main parameter corresponding to said one parameter includes the input coding bit rate, and said other parameter includes the input frame rate; and the estimation model specifying step comprises an optimum frame rate calculation step calculating an optimum frame rate representing a frame rate corresponding to a best subjective video quality of the audiovisual medium transmitted at the coding bit rate, a best video quality calculation calculating best video quality corresponding to a best value of the subjective video quality of the audiovisual medium transmitted at the input coding bit rate, and an estimation model generation step generating the estimation model on the basis of estimation on model specifying parameters including the optimum frame rate and the best video quality.

* * * * *

UNITED STATES PATENT AND TRADEMARK OFFICE
CERTIFICATE OF CORRECTION

| | | |
|---|---|---|
| PATENT NO. | : 7,965,203 B2 | Page 1 of 1 |
| APPLICATION NO. | : 11/886408 | |
| DATED | : June 21, 2011 | |
| INVENTOR(S) | : Kazuhisa Yamagishi and Takanori Hayashi | |

It is certified that error appears in the above-identified patent and that said Letters Patent is hereby corrected as shown below:

In the Claims, Column 30, Claim 2, line 5, please delete "wherein wherein" and insert --wherein--.
Column 30, Claim 3, line 18, please delete "wherein wherein" and insert --wherein--.

Column 31, Claim 11, lines 38-39, please delete "parameter" and insert --parameters--.
Column 31, Claim 11, line 45, please delete "mode" and insert --model--.
Column 31, Claim 11, line 47, please delete "a" and insert --an--.
Column 31, Claim 11, line 48, please delete ",".

Column 33, Claim 19, line 34, please insert --a-- between "causing" and "parameter".
Column 33, Claim 19, line 37, please delete "coding , bit" and insert --a coding bit--.
Column 33, Claim 19, line 40, please insert --time-- after "unit".
Column 33, Claim 19, line 43, please delete "s" after "model".
Column 33, Claim 19, line 45, after "parameters," insert --an--.

Column 34, Claim 20, line 14, please delete "genera on" and insert --generation--.

Column 35, Claim 29, line 45, please delete "parameter" and insert --parameters--.
Column 35, Claim 29, lines 46-47, please delete "respective" and insert --respectively--.
Column 35, Claim 29, line 47, please delete "parameter" and insert --parameters--.
Column 35, Claim 29, line 51, please delete "rarity" and insert --plurality--.
Column 35, Claim 29, lines 54-55, please delete "corresponding o one he audiovisual medium parameters, an estimation el" and insert --corresponding to one parameter of the audiovisual medium parameters, an estimation model--.

Column 38, Claim 37, line 7, please delete "-of".
Column 38, Claim 37, line 38, please insert --input-- between "the" and "coding".
Column 38, Claim 37, line 39, please insert --step-- between "calculation" and "calculating".

Signed and Sealed this
Fourteenth Day of February, 2012

David J. Kappos
*Director of the United States Patent and Trademark Office*